US009477139B2

(12) United States Patent
McKinley

(10) Patent No.: US 9,477,139 B2
(45) Date of Patent: Oct. 25, 2016

(54) AUTO-FOCUS CAMERA MODULE WITH MEMS CAPACITANCE ESTIMATOR

(71) Applicant: DigitalOptics Corporation, San Jose, CA (US)

(72) Inventor: David McKinley, Fairfield, CA (US)

(73) Assignee: DIGITALOPTICS CORPORATION, San Jose, CA (US)

( * ) Notice: Subject to any disclaimer, the term of this patent is extended or adjusted under 35 U.S.C. 154(b) by 0 days.

(21) Appl. No.: 14/798,200

(22) Filed: Jul. 13, 2015

(65) Prior Publication Data
US 2015/0316834 A1 Nov. 5, 2015

Related U.S. Application Data

(63) Continuation of application No. 13/789,603, filed on Mar. 7, 2013, now Pat. No. 9,081,264.

(60) Provisional application No. 61/748,062, filed on Dec. 31, 2012, provisional application No. 61/748,054, filed on Dec. 31, 2012.

(51) Int. Cl.
*G03B 13/36* (2006.01)
*H04N 5/225* (2006.01)
*G03B 3/10* (2006.01)
*H04N 5/232* (2006.01)

(52) U.S. Cl.
CPC ............... *G03B 13/36* (2013.01); *G03B 3/10* (2013.01); *H04N 5/2253* (2013.01); *H04N 5/2257* (2013.01); *H04N 5/23212* (2013.01); *G03B 2205/0046* (2013.01); *G03B 2205/0084* (2013.01)

(58) Field of Classification Search
CPC ...... G03B 13/36; G03B 3/10; H04N 5/2257; H04N 5/2253; H04N 5/23212
USPC .......... 396/79–82, 93–94, 139; 348/345–357
See application file for complete search history.

(56) References Cited

U.S. PATENT DOCUMENTS

| 7,697,834 | B1* | 4/2010 | Tsai | G02B 7/38 250/201.2 |
|---|---|---|---|---|
| 9,081,264 | B2* | 7/2015 | McKinley | |
| 2012/0274787 | A1* | 11/2012 | Ngo et al. | 348/187 |
| 2013/0169857 | A1* | 7/2013 | Christo | H04N 5/23212 348/349 |

* cited by examiner

*Primary Examiner* — Nelson D. Hernández Hernández
(74) *Attorney, Agent, or Firm* — Haynes and Boone, LLP

(57) ABSTRACT

A MEMS actuator for a compact auto-focus camera module is configured to measure physical values and to estimated values each indicative of position or motion or both of a MEMS component. A smart logic component determines a set of MEMS driver control values based on analyzing the measured physical values and substituting estimated values to more accurately position the MEMS component. A MEMS driver component receives the set of MEMS driver control values and controls the position or motion, or both, of the MEMS component based on the MEMS driver control values.

18 Claims, 22 Drawing Sheets

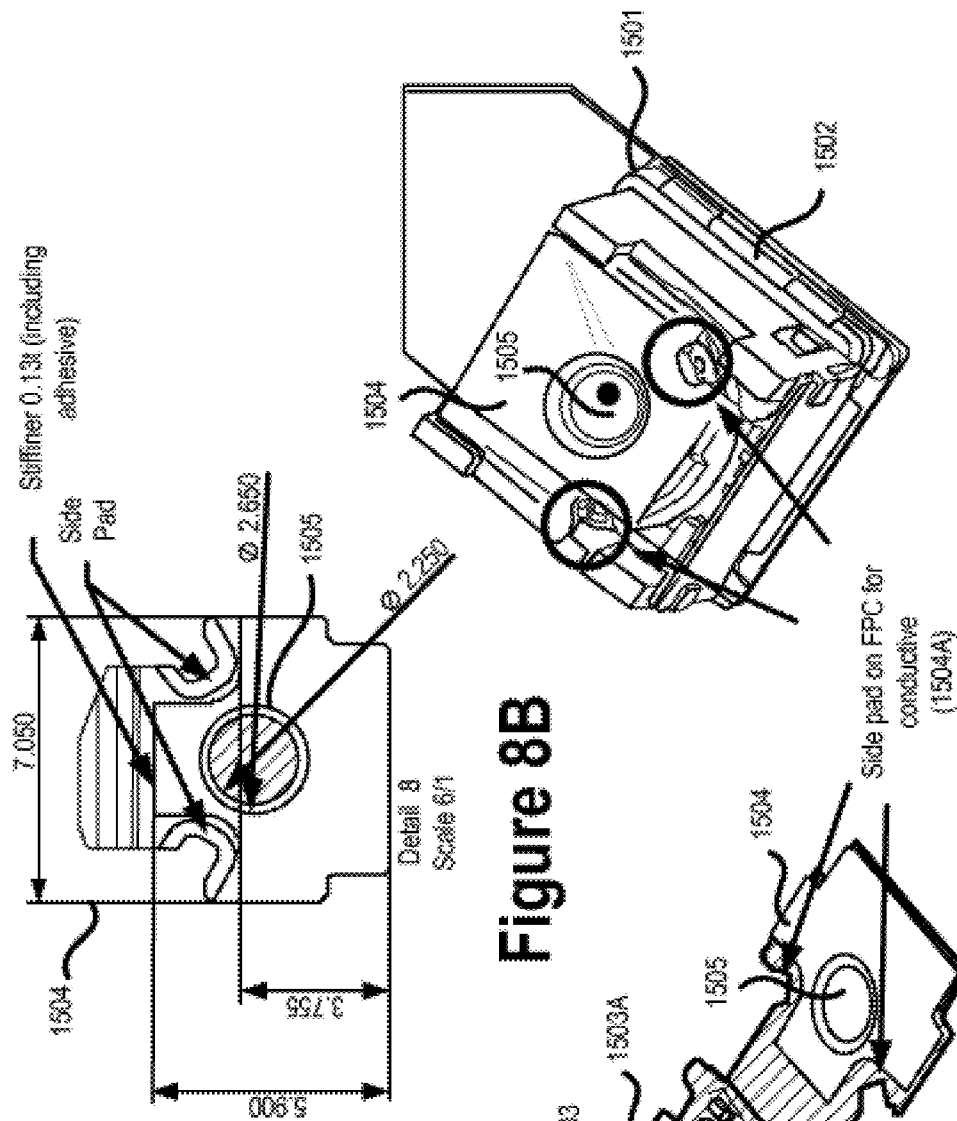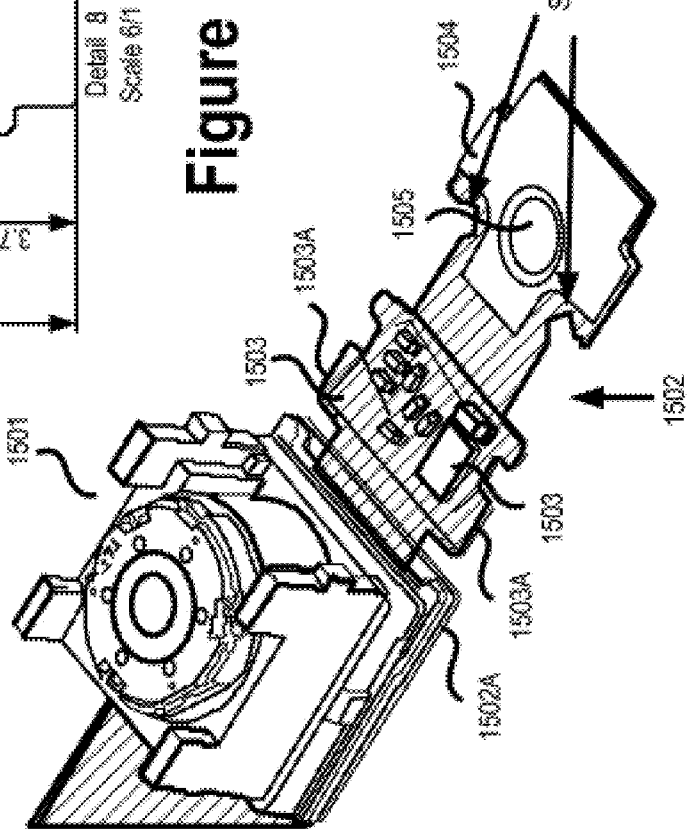

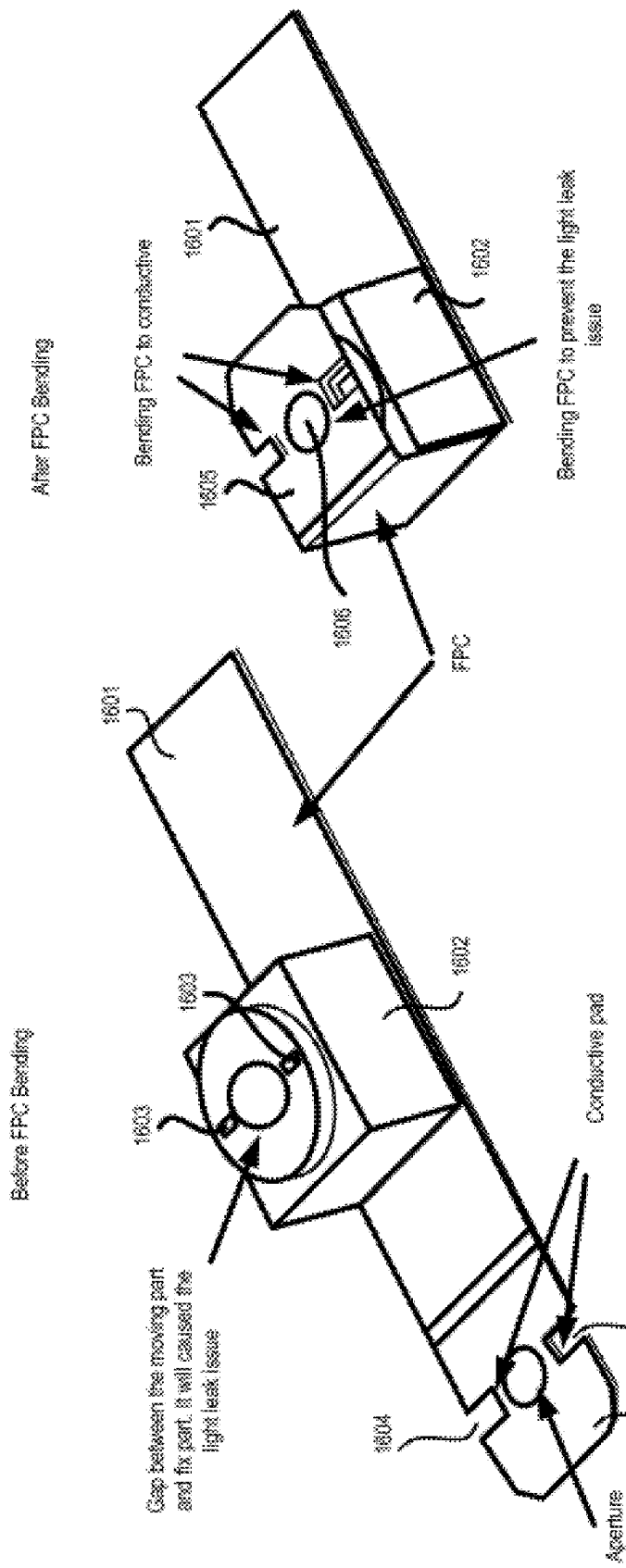

AUTO-FOCUS CAMERA MODULE WITH MEMS CAPACITANCE ESTIMATOR

CROSS-REFERENCE TO RELATED APPLICATIONS

The present application is a continuation application of U.S. patent application Ser. No. 13/789,603, filed on Mar. 7, 2013, the content of which is expressly incorporated by reference herein in its entirety. This application also claims the benefit of priority under 35 USC §119 to U.S. provisional patent applications Nos. 61/748,054, and 61/748,062, each filed Dec. 31, 2012. U.S. patent application Ser. No. 13/789,603 is one of three contemporaneously-filed applications, entitled, Auto-Focus Camera Module with MEMS Closed Loop Compensator (U.S. patent application Ser. No. 13/789,594, filed Mar. 7, 2013, now U.S. Pat. No. 8,988,586, issued Mar. 24, 2015); Auto-Focus Camera Module with MEMS Capacitance Estimator (U.S. patent application Ser. No. 13/789,603, filed Mar. 7, 2013); and Auto-Focus Camera Module with MEMS Distance Measurement, (U.S. patent application Ser. No. 13/789,608, filed Mar. 7, 2013, now U.S. Pat. No. 9,055,207, issued Jun. 9, 2015); each by inventor David McKinley.

BACKGROUND

1. Field of the Invention

The invention relates to compact camera modules, and particularly having auto-focus, and optionally zoom, functionality including an efficient and versatile MEMS component.

2. Description of the Related Art

A camera module may be figuratively or actually separated into two main components, namely a sensor component and an optical train component. If the positions of all lenses of the optical train and/or one or more constituent lenses are fixed relative to the position of the image sensor the resulting electronic camera is said to be fixed focus. Rigidly fixing the optical system in place means only objects that are a certain distance from the camera will be in focus on the image sensor. Fixed focus cameras have advantages in terms of smallness of physical dimensions and cost, but the performance is limited. In particular, the focus distance is often set at 1.2 m so that objects from 60 cm to infinity appear tolerably sharp. However, the image sharpness is not especially good and objects that are closer to the camera than 60 cm will always be blurred. While it is possible to set the focus at a closer distance to correct for this problem, this means that the sharpness of distant objects declines in compensation.

It is therefore desired to have a compact camera module that has auto-focus, and optionally zoom, functionality that includes an efficient and versatile MEMS component.

BRIEF DESCRIPTION OF THE DRAWINGS

FIGS. 8A-8C schematically illustrate a camera module, with FPC extension before-FPC bending perspective, during-FPC bending overhead, and after-FPC bending rotated perspective views, respectively, in accordance with certain embodiments.

FIGS. 9A-9B schematically illustrate a camera module in accordance certain embodiments, before and after FPC bending as in FIGS. 8A and 8C, respectively, wherein the FPC is configured both to electrically connect to actuator contacts and to serve as or couple to a light leak baffle, e.g., as alternative to the embodiment described with reference to FIGS. 6A and 7.

DETAILED DESCRIPTIONS OF THE EMBODIMENTS

Figure 1:
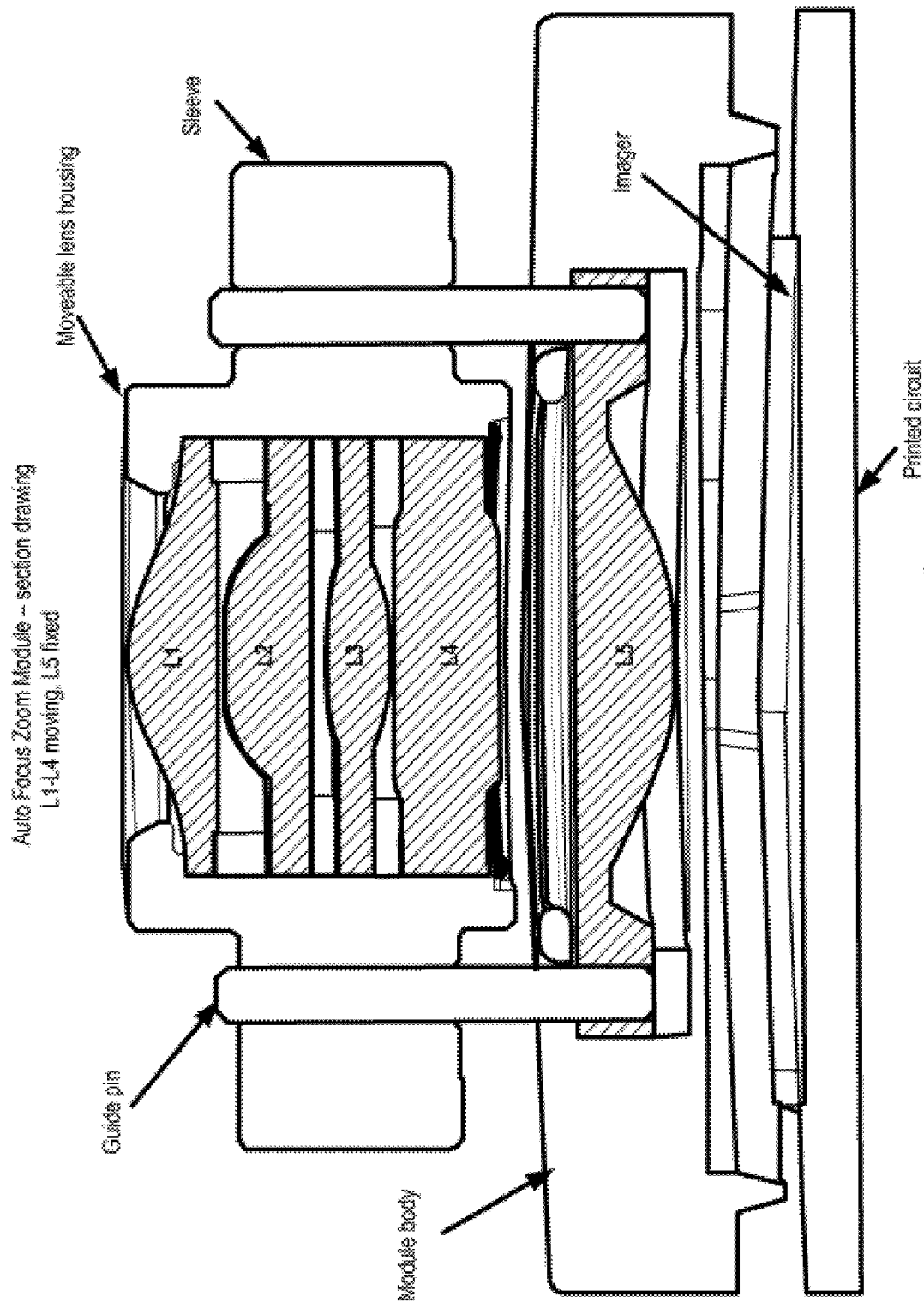
FIG. 1 schematically illustrates a cross sectional view of an example of an auto focus camera module including a subset of movable lenses and a MEMS actuator in accordance with certain embodiments.

A compact optical module for an auto-focus camera module is provided in accordance with certain embodiments including a MEMS component. In certain embodiments, the MEMS component includes a closed loop compensator. The compact optical module is configured for coupling with an image sensor component of an auto focus digital camera module. An optical train includes multiple lenses including at least one movable lens. A housing is configured to contain the optical train and couple with an image sensor component. A MEMS actuator is configured to move the at least one movable lens along an optical path to focus a subject onto an image sensor of an image sensor component that is disposed at a focal plane of the optical train and that is coupled to a printed circuit to carry electronic signals that include digital images captured by the image sensor. A pair of lens actuator control pads is configured for receiving lens actuator control signals from the printed circuit. An alignment compensation component may be included in certain embodiments to position and align the at least one movable lens and adapted to account for a specific focus distance and for a camera module orientation and nonlinear displacement property of the at least one movable lens.

The closed loop control component may include an adaptive control component. The alignment compensation component may include a closed loop control component. The closed loop control component may include an adaptive control component. The alignment compensation component may have a positioning accuracy within approximately 2%. The optical module may include a lens barrel that contains therein one or more of the multiple lenses including the at least one movable lens.

A compact auto-focus camera module is provided that includes an image sensor and an optical train including multiple lenses including at least one movable lens. A housing is configured to contain the optical train and image sensor. A MEMS actuator is configured to move the at least one movable lens along an optical path to focus a subject onto the image sensor that is disposed at a focal plane of the optical train and that is coupled to a printed circuit to carry electronic signals that include digital images captured by the image sensor. A pair of lens actuator control pads is configured to receive lens actuator control signals from the printed circuit. An alignment compensation component is configured to position and align the at least one movable lens and adapted to account for a specific focus distance and for a camera module orientation and nonlinear displacement property of the at least one movable lens.

A compact auto-focus camera module-enabled embedded device is provided that includes a device processor and a device display, one or more communication signal interfaces including phone and/or wired and/or wireless internet send/receive components and a compact auto-focus camera module in accordance with any of the camera modules described herein.

Another method of operating a compact MEMS-actuated auto-focus camera module is provided, wherein a subject is imaged onto an image sensor using multiple lenses including at least one movable lens. MEMS actuation moves the at least one movable lens along an optical path to focus the subject onto the image sensor, which is disposed at a focal plane and is coupled to a printed circuit. Electronic signals are sent along the printed circuit including digital image data captured by the image sensor. Lens actuator control signals are received from the printed circuit. The MEMS actuation includes positioning and aligning the at least one movable lens including accounting for a specific focus distance and for a camera module orientation and nonlinear displacement property of the at least one movable lens.

The method may include adaptively controlling the actuating. The positioning and aligning may include closed loop control. The closed loop control may include adaptively controlling the positioning and aligning. The aligning may have a positioning accuracy within approximately 2%.

Another compact optical module is provided in accordance with certain embodiments for coupling with an image sensor component of an auto focus digital camera module including a MEMS component with distance measurement capability. An optical train of the optical module includes multiple lenses including at least one movable lens. A housing is configured to contain the optical train and couple with an image sensor component. The MEMS actuator is configured to move the at least one movable lens along an optical path to focus a subject onto an image sensor of an image sensor component that is disposed at a focal plane of the optical train and that is coupled to a printed circuit to carry electronic signals that include digital images captured by the image sensor. A capacitance measurement component is configured to determine MEMS actuator capacitance values as input to a processor that is programmed accordingly to determine motion and displacement of the optical module or the camera module or the at least one movable lens, or combinations thereof, and to adapt a position and alignment of the at least one movable lens to account for a specific focus distance. A pair of lens actuator control pads is configured to couple to the printed circuit for receiving lens actuator control signals including the MEMS actuator capacitance values.

The capacitance measurement component may include one or more of a Nyquist sampling time discriminator to detect ringing during operation, a programmable driver equalization component for providing a Voltage drive based on capacitance sensing settling time, a programmable current source configured to move a capacitance measurement beyond noise levels for a MEMS actuator capacitance measurement, and/or a programmable sliding window configured to adapt to the MEMS actuator for a MEMS actuator capacitance measurement. A lens barrel may contain therein one or more of the multiple lenses including the at least one movable lens.

A compact auto-focus camera module is also provided including an image sensor and an optical train including multiple lenses including at least one movable lens. A housing is configured to contain the optical train and image sensor. A MEMS actuator is configured to move the at least one movable lens along an optical path to focus a subject onto an image sensor of the image sensor component that is disposed at a focal plane of the optical train and that is coupled to a printed circuit to carry electronic signals that include digital images captured by the image sensor. A pair of lens actuator control pads is configured for receiving lens actuator control signals from the printed circuit. A capacitance measurement component is configured to determine MEMS actuator capacitance values as input to a processor that is programmed accordingly to determine motion and displacement of the camera module, one or more lenses of the optical train, or the at least one movable lens, or combinations thereof, and to adapt a position and alignment of the at least one movable lens to account for a specific focus distance.

A compact auto-focus camera module-enabled embedded device includes a device processor and device display, one or more communication signal interfaces including phone and/or wired and/or wireless internet send/receive components, and any of the compact auto-focus camera modules described herein.

Another method of operating a compact MEMS-actuated auto-focus camera module is provided. A subject is imaged onto an image sensor using multiple lenses including at least one movable lens. A MEMS component actuation moves the at least one movable lens along an optical path to focus the subject onto the image sensor that is disposed at a focal plane of the optical train and that is coupled to a printed circuit. Electronic signals are sent along the printed circuit including digital image data captured by the image sensor. Lens actuator control signals are received from the printed circuit. MEMS actuator capacitance values are determined. Motion and displacement of the camera module, one or more optics of the optical train, and/or the at least one movable lens are determined based on the MEMS actuator capacitance values. A position and alignment of the at least one movable lens are adapted based on the determined motion and displacement to account for a specific focus distance.

The determining MEMS actuator capacitance values may include one or more of Nyquist sampling time discriminating to detect ringing during operation, programmably equalizing a Voltage driver based on capacitance sensing settling time, programmably controlling a current source to move a capacitance measurement beyond noise levels for a MEMS actuator capacitance measurement, and/or programmably sliding a window configured to adapt to the actuating of the MEMS component for a MEMS actuator capacitance measurement.

The embodiments set forth above or below herein and/or in any of the references incorporated by references may be combined to form additional embodiments. For example, one or more features of any of the following embodiments may be combined with any of the above-described embodiments:

A compact camera module is provided in accordance with certain embodiments that includes an image sensor configured to couple to a flexible printed circuit to power the camera module and transmit images captured at the image sensor, and an optical train aligned with the image sensor that includes multiple lenses. At least one movable lens is coupled to an actuator, e.g., a MEMS actuator, to form an optical system that is configured to automatically adjust a position of the at least one movable lens along the optical path to focus an object disposed within an auto-focus range of the camera module onto the image sensor. The compact camera module includes an EMI housing configured to contain the optical train and to shield camera module components from electromagnetic interference (EMI). The EMI housing has defined therein a focus-adjustment aperture that is large enough to permit an object end of the optical train to at least partially protrude therethrough at one end of the auto-focus range. A light leak baffle has a baffle aperture defined therein that partially overlaps the focus-adjustment aperture along the optical path. The light leak baffle includes EMI shield material that partially overlaps the focus adjustment aperture in the direction of the optical path, but lies outside the auto-focus range along the direction of the optical path.

Another auto focus digital camera module that includes a housing, an image sensor within the housing, an optical train within the housing aligned with the image sensor defining an optical path and including multiple lenses including at least one movable lens coupled to a lens actuator configured to move the at least one movable lens along the optical path to focus a subject onto the image sensor that is disposed within an auto-focus range of the camera module. A a flexible printed circuit (FPC) includes a sensor segment coupled to the image sensor to power the camera module and to carry electronic signals that include digital images captured by the image sensor. The FPC also includes an extension segment spaced from the sensor segment that includes electrical contact pads configured to electrically couple to lens actuator contact pads to carry lens actuator control signals when the FPC is folded around the camera module from the sensor end to the object end.

Another compact camera module is provided for an auto focus digital camera including a housing configured to contain imaging optics and digital electronics for capturing and transmitting images and to shield electronic components from electromagnetic interference (EMI). An optical train is coupled and aligned with an image sensor and is configured to define an optical path to focus a subject onto an image sensor that is disposed at a focal plane of the optical train. A flexible printed circuit is coupled to the image sensor to carry electronic signals that include digital images captured by the image sensor. A light leak baffle is coupled to the flexible printed circuit and defines a baffle cavity a predetermined distance from the image sensor such that upon folding the FPC onto the housing the light leak baffle is disposed at the subject side of the optical train and the baffle cavity overlaps the optical path.

A compact camera module for an auto focus digital camera is also provided that includes a housing configured to contain imaging optics and digital electronics for capturing and transmitting images and to shield electronic components from electromagnetic interference (EMI). An optical train is coupled and aligned with an image sensor including multiple lenses configured to define an optical path within the housing to focus a subject onto the image sensor that is disposed at the focal plane of the optical train. A MEMS actuator is coupled to at least one movable lens of the optical train that is movable through an auto-focus range of a camera module formed by aligning an image sensor component to the compact optical module. A flexible printed circuit is coupled to the image sensor to carry electronic signals that include digital images captured by the image sensor. The FPC includes an extension segment that is configured such that, upon folding the FPC onto the housing, one or more electrical contact pads disposed on the subject side of the optical train are coupled electrically with contact pads on the FPC extension segment from which MEMS actuator control signals are transmittable directly from the FPC to the MEMS lens actuator.

Another auto focus digital camera module is provided that includes a housing having an outer surface for enclosing the camera module and an interior framework, an image sensor within the housing, and an optical train coupled within the interior framework of the housing and aligned with the image sensor defining an optical path and including multiple lenses. A lens actuator, e.g., MEMS actuator, is configured to move at least one movable lens of the optical train along the optical path to focus onto an active plane of the image sensor an image of a subject that is disposed within an auto-focus range of the camera module. A printed circuit, e.g., a flexible, rigid or rigid-flexible printed circuit or a printed circuit board, is coupled to the image sensor to power the camera module and to carry electronic signals that include digital images captured by the image sensor. The printed circuit is also coupled electronically to the lens actuator to carry lens actuator control signals. An electromagnetic interference (EMI) shield coating is provided on an outside surface of the housing. A conductive trace is provided on one or more surfaces of an interior framework of the housing that permits lens actuator control signals to be carried from electrical contact pads on the printed circuit to lens actuator contact pads.

Another auto focus digital camera module is provided that includes an EMI shield housing containing a bracket that forms an interior framework inside the housing. An optical train including multiple lenses is coupled to and aligned with an image sensor within the housing to define an optical path. At least one movable lens is coupled to a lens actuator, such as a MEMS actuator, configured to move the at least one movable lens along the optical path to focus an image of a subject that is disposed within an auto-focus range of the camera module. A printed circuit is coupled to the image sensor to power the camera module and to carry electronic signals that include digital images captured by the image sensor. One or two conductive traces are formed along one or more surfaces of the bracket to electrically connect one or more, e.g., a pair of, electrical contact pads on the printed circuit to contact pads on the lens actuator permitting lens actuator control signals to be carried between the electrical contact pads on the printed circuit and the contact pads on the lens actuator.

Another compact optical module is provided that is configured for coupling with an image sensor component of an auto focus digital camera module. An optical train of the compact optical module includes multiple lenses including at least one movable lens and a lens actuator configured to move the at least one movable lens along an optical path to focus a subject onto an image sensor that is disposed at a focal plane of the optical train and that is coupled to a printed circuit to carry electronic signals that include digital images captured by the image sensor. An interior housing is configured as a framework to contain and align the optical train and image sensor, while an outer housing contains the interior housing and the optical train and is configured to shield the optical train and the image sensor from both electromagnetic interference (EMI) and external physical shocks. One or more shock absorbing sponges are disposed between the outer housing and the interior housing that are configured to compress to absorb external physical shocks in three spatial dimensions. One or more volumetric sponge compression gaps are defined between the external housing and the interior housing to permit relative movement without contact in a direction of the optical path of the exterior housing towards the interior housing.

Another compact camera module is provided that includes a compact optical module coupled to a sensor module, and otherwise including any of the compact optical module, compact camera module and/or sensor module features described herein. Further embodiments include combinations of features described herein.

Auto-Focus Camera Modules

A camera module in accordance with embodiments described herein includes an image sensor, which converts an image in an optical domain to an electronic format, and an optical train that focuses the scene of interest onto the image sensor. Embodiments include cameras configured with an enhanced ability to accurately capture detail in a scene. The quality of the optical train and/or the resolution of the image sensor may be selected in accordance with a desired ability to accurately capture such detail. The image sensor may contain millions of pixels (picture elements) and the optical train of an auto-focus camera module in accordance with certain embodiments may include two, three, four, five or more lenses.

The position of at least one movable lens of the optical train is not fixed relative to the position of the image sensor, and thus, auto-focus camera modules in accordance with embodiments described herein can alter the distance from the electronic camera at which objects will be in focus on the image sensor. A system may be utilized in accordance with embodiments to determine one or more distances of one or more principal objects in a scene from the camera. The at least one movable lens is movable in accordance with the determined distance and/or until one or more principle objects are in focus on the image sensor. These objects can range from being very close (10 cm or closer) to very distant (infinity) from the camera.

Embodiments are provided herein of cameras that provide image quality that is better than conventional autofocus and fixed focus cameras. Camera modules in accordance with certain embodiments also exhibit miniature size, as well as advantageous power efficiency, and efficient, durable packaging environments that protect against unwanted physical shocks and electromagnetic interference.

Electronic cameras in accordance with certain embodiments exhibit an advantageous capability to alter the field of view significantly. For example, a photograph of a family taken in front of their house might inadvertently include a refuse container at the edge of the scene when a conventional camera is being used. A camera in accordance with certain embodiments can be adjusted to restrict the field of view of the camera to eliminate this artefact from the captured image. Conversely, a photograph of a family taken on top of a hill can be enhanced using a camera in accordance with certain embodiments by adjusting to a wider field of view that captures more of the panorama.

Cameras in accordance with certain embodiments exhibit clear improvements in overall performance by incorporating dynamic field of view feature with an auto focus mechanism. In certain embodiments, the design of the optical train of the camera includes a part that is fixed and a part that is movable along the optical axis of the camera by an actuator. In certain embodiments, some image processing is provided by code embedded within a fixed or removable storage device on the camera and/or using a remote processor, e.g., removal of image distortion.

Advantageous cameras are provided in accordance with certain embodiments that integrate all three of these in a compact camera module. Such camera module may be a stand alone camera product, or may be included in a fixed or portable electronics product, and/or in various other environments such as automobiles.

Several embodiments will now be described with reference to the figures. Electronic cameras are provided herein that advantageously incorporate integrated auto focus and optionally zoom functionality. In certain embodiments, the autofocus and zoom functions utilize a combination of an advantageous optical train and processor-based image processing, and in certain embodiments include the same or similar components in both cases.

Alternative approaches to add auto focus may involve moving one or more other lenses in the optical train as a group. An auto focus zoom camera based on this principal of operation is described in U.S. Patent application Ser. No. 61/609,293 which is incorporated by reference. This movable lens group may contain more than one movable lens, and may contain four lenses as described in the '293 application, as well as various numbers of stops and apertures depending on the particular number and geometry of the lens or lenses forming the movable lens group.

An optical train in accordance with certain embodiments that includes auto focus, and optionally also zoom, includes two general components, namely a movable lens group and a fixed lens group. FIG. 1 illustrates an auto focus zoom camera module including a first movable lens group (e.g., L1-L4) that includes one or more movable lenses that can be moved along the optical axis of the camera, and a fixed lens group (e.g., L5) that includes at least one lens that is fixed in position. The one or more moving lenses include four lenses L1-L4 in the example of FIG. 1 that are closest to the scene, while a fixed lens L5 is closest to the image sensor.

In general terms, the moving lens group performs the function of altering the focal distance of the camera, and in embodiments of camera modules that also include zoom, at least one fixed lens is configured to perform the optional electronic zoom function of matching the PSF function of the optic to the imager and compensating for the field curvature induced by the moving lens group. The fixed lens that may perform this function in specific embodiments described in the '293 application is the lens closest to the image sensor. At least one moving lens is located at an appropriate distance along the optical axis to achieve the desired focus distance, while at least one fixed lens is located such that its back focal length matches the distance between the lens and the imager.

A processor programmed by embedded code may collect information from pixels in the image sensor and make changes to the associated electronic file, in some cases automatically and in others based on user inputs, to provide zoom, as well as possibly many other image processing enhancements as set forth in the patents and pending patent applications incorporated by reference below. For example, the degree of zoom may be adjustable. The processor may also be programmed to endeavor to correct for distortion and other artifacts that are produced in a predictable manner by the optical train. The image processing features can be implemented in either hardware or software. In certain embodiments, these features are placed early in the image processing pipeline, such as RTL (resistor transistor logic) code embedded in the image sensor, while in others they are placed on an external DSP (digital signal processor) or entirely in software in a processor, such as the base band chip in a mobile phone.

Face or other object detection, tracking, and/or recognition may be utilized in combination with an auto-focus process of a camera module in accordance with certain embodiments. Certain of these embodiments are described in U.S. Pat. Nos. 8,331,715, 8,279,301, 8,270,674, 8,224,108, 8,055,090, 7,916,897, 7,853,043, 7,634,109, 7,362,368, and U.S. patent application No. 61/657,012, each of which are hereby incorporated by reference.

An auto focus zoom camera example in accordance with the example illustrated at FIG. 1 may have a focus distance in certain embodiments that can range from 10 cm to 9 m, is typically 15 cm to 5 m and is preferably 20 cm to 3 m (excluding the hyper-focal distance), while the zoom function can range between ×0.5 to ×5, may be typically ×1 to ×4 and may be more specifically in certain embodiments between ×1 to ×3. A noteworthy characteristic of the final electronic file produced by an advantageous camera module in accordance with certain embodiments is that file size and effective resolution of the image contained within it may be largely constant in certain embodiments irrespective of the focus distance and zoom setting.

A variable optic camera in accordance with certain embodiments includes a camera wherein the optical train is divided into groups, some of which are fixed in functionality and position and others of which are variable in functionality and position. By this means, more advanced control of the optical train can be accomplished. For example, by moving two particular groups of lenses along the optical axis, the field of view of the camera can be altered. Because the resolution of a camera may be generally fixed in certain embodiments by other parameters, restricting the field of view results in effective magnification of objects in the scene. Consequently, cameras of this type are referred to as zoom cameras or auto-focus zoom cameras.

Auto-Focus Zoom Camera Modules

Several different embodiments include advantageous auto focus zoom cameras, and/or components or subsets of features of auto focus zoom cameras. In one embodiment, auto focus and zoom functionality is accomplished through a combination of: (i) one lens that is configured in combination with a zoom algorithm to provide electronic zoom and that is fixed in position relative to the image sensor, (ii) a single lens that can be moved along the optical axis of the camera or alternatively two or more moving lenses or a combination of one moving lens with two or more fixed lenses, and (iii) the zoom algorithm programmable image processing component that makes changes to the electronic form of the image. Zoom is provided in alternative embodiments with a movable lens component. In other embodiments, auto focus camera modules that do not include a zoom component are provided, wherein the example lens trains described herein for auto focus zoom camera modules may be used in auto focus camera modules (i.e., not including zoom), or the lens train may be simplified, particularly with regard to lens L5. Related embodiments and alternative features relating especially to the zoom feature of this embodiment may be described at U.S. reissue Pat. RE42,898 and at US published patent applications nos. 2009/0115885 and 2009/0225171 and are incorporated by reference. In another embodiment, zoom functionality is provided by one or more moving lenses. The single lens that can be moved in the electronic zoom embodiment may be one that is sited in the middle of the optical train and that is movable to provide auto focus functionality. More than a single lens may be movable in other embodiments, and more than one fixed lens are included in other embodiments.

Certain other optical components are included in various combinations in different embodiments, such as one or more stops, apertures and/or an infrared filter that are not always specifically mentioned with each embodiment. The infrared filter may be included between the image sensor and the last lens of the optical train, or elsewhere along the optical path. One or more apertures may be fixed at a surface of lens or independently fixed to the camera module housing or to a lens barrel housing or other fixed component of the camera module or camera device. One or more apertures may move, such as a movable aperture on or with the movable lens. In certain embodiments, an aperture for the movable lens is movable as being on or near the surface of the movable lens or otherwise fixed relative to the movable lens so that the aperture and movable are movable together using the actuator. In other embodiments the aperture for the movable lens can be fixed relative to the image sensor.

An electronic camera incorporating a fixed lens of the type described is able to provide for dynamic alteration of the field of view, in other words zoom, by imaging cropping. While cropping usually decreases image quality since information from the scene is discarded, the fidelity of the cropped image is preserved in certain embodiments because the center of the image has been magnified by this fixed lens. This fixed lens is used in certain embodiments to produce a dynamic field of view camera that, unless corrected, would produce distortion of the image that resembles barrel distortion. The extent of the distortion is fixed and controlled by the lens design. This makes it relatively efficient to correct and remove the distortion and other predictable artefacts by configuring the image data in an image processing operation performed by an on-board processor either within the camera module itself, or outside the camera module but inside a device such as a camera phone or portable camera or tablet or laptop or other device that includes the camera module as a component of the device, or other processor coupled physically or electronically or by wireless signal to the device, and programmed by a certain algorithm designed for the specific purpose. Several embodiments of a camera with zoom based on this principal of operation are described in U.S. Pat. RE42,898, US published patent applications nos. 2012/0063761, 2011/0221936, 2011/0216158, 2009/0115885 and 2009/0225171, and/or U.S. patent application Ser. Nos. 61/609,293 and 13/445,857, which are incorporated by reference. The algorithm may be stored on the camera module or outside the camera module within an electronic device within which the camera module is a component, or on the cloud or otherwise as long as it is accessible by the processor that is being utilized by the camera module that is configured to apply the algorithm to image data, e.g., raw data from the image sensor or pre-processed image data, that is not yet stored, transmitted or displayed as permanent image data until the processor applies the algorithm to the data so that the image may be displayed with the appearance of zoom magnification.

The fixed lens involved in producing zoom in combination with an algorithm is, for reasons of physics advantageously disposed in certain embodiments as the lens closest to the image sensor. Alternative approaches to add auto focus may involve moving one or more other lenses in the optical train as a group. An auto focus zoom camera based on this principal of operation is described in U.S. Patent application Ser. No. 61/609,293 which is incorporated by reference. This movable lens group may contain more than one movable lens, and may contain four lenses as described in the '293 application, as well as various numbers of stops and apertures depending on the particular number and geometry of the lens or lenses forming the movable lens group. The embodiments wherein only a single lens is included in the movable lens group, such as the middle lens L3 being movable relative to two pairs of fixed lenses L1-L2 and L4-L5 located on either side of the middle lens L3 as illustrated schematically at FIGS. 2A-2B, have an advantage of smaller mass and thus a relatively lower force is involved in moving it, and even has a surprising further advantage that a smaller displacement range actuator may be used.

Another feature of an auto focus zoom camera module in accordance with certain embodiments involves the realization of auto focus in combination with zoom from a fixed zoom lens of the type described above, by moving the middle lens in the optical train in certain embodiments, e.g., L3 in an optical train including five lenses or L4 in an optical train of seven lenses or L2 in a train of three lenses. In other embodiments, the movable lens is offset from the middle somewhere between at least one fixed lens and the rest of the optical train, e.g., L2 or L4 in the five lens embodiment or L2, L3, L5 or L6 in the seven lens embodiment. Still other embodiments involve movable lenses at one or both ends of the optical train.

Figure 2A:
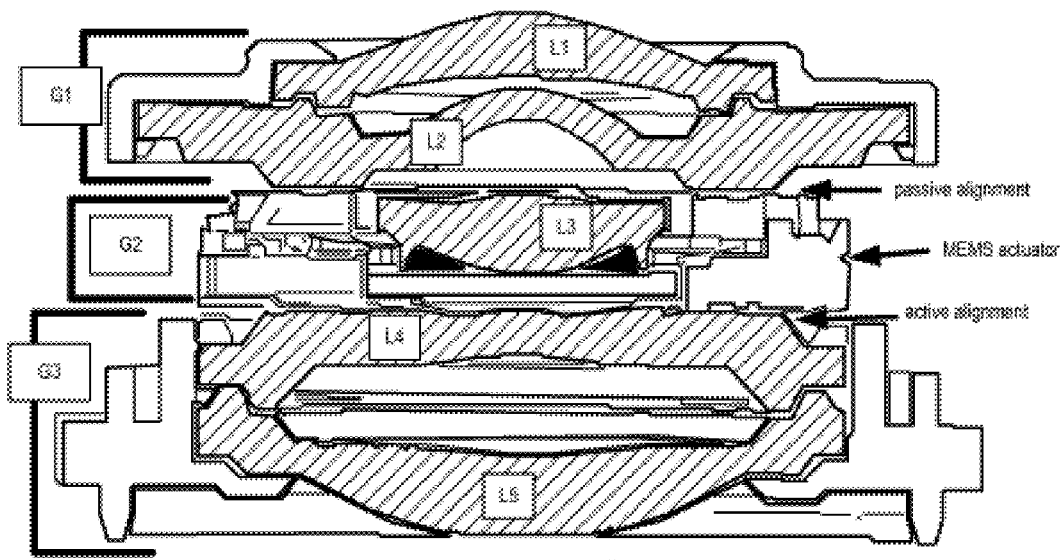
FIG. 2A schematically illustrates another example of an auto focus camera module including a different subset of one or more movable lenses and a MEMS actuator in accordance with certain embodiments.
Figure 2B:
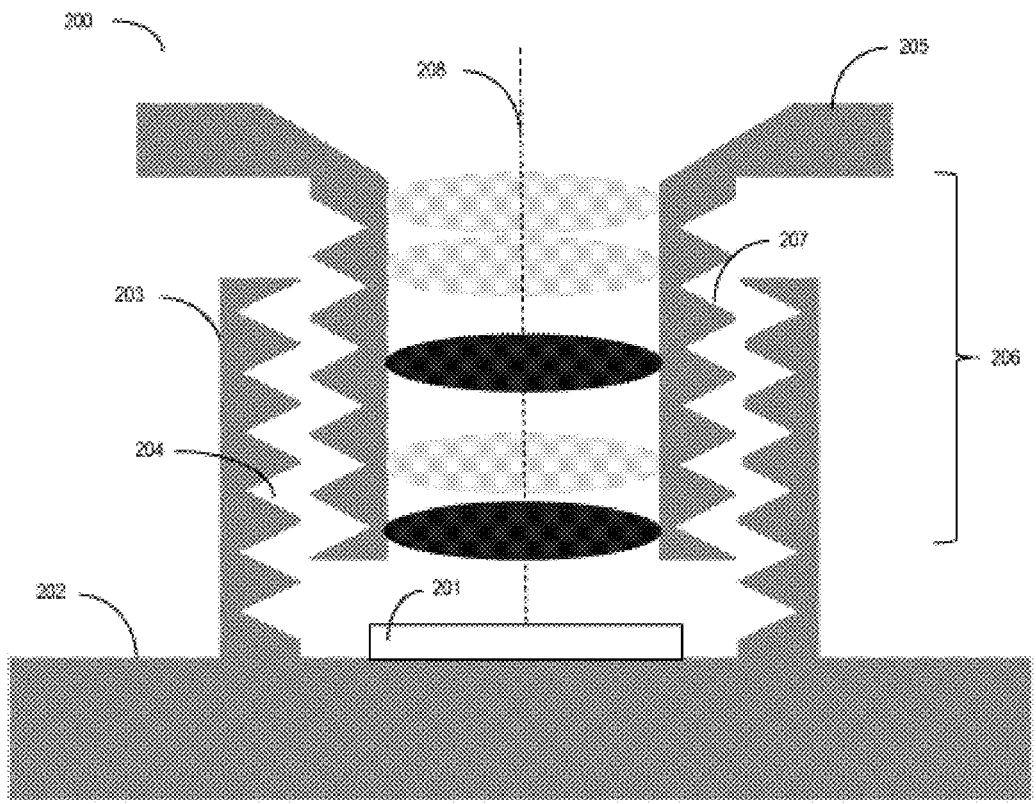
FIG. 2B illustrates a camera module that includes two main subcomponents including a sensor component and an optical train component that may be coupled and uncoupled such as to be interchangeable.

Referring now to FIGS. 2A-2B, another example of an auto focus camera module is schematically illustrated, wherein the middle lens L3 is movable between two pairs of fixed lenses L1-L2 and L4-L5. This embodiment is described at U.S. patent application Ser. No. 61/643,331, which is incorporated by reference. The embodiments wherein only a single lens is included in the movable lens group, such as the middle lens L3 being movable relative to two pairs of fixed lenses L1-L2 and L4-L5 located on either side of the middle lens L3 have an advantage of small mass, and thus a relatively low force is involved in moving it. The single movable lens embodiments also have a surprising further advantage that a small displacement range actuator may be used. By moving the middle lens in the optical train in certain embodiments, e.g., L3 in an optical train including five lenses or L4 in an optical train of seven lenses or L2 in a train of three lenses. In other embodiments, the movable lens is offset from the middle somewhere between at least one fixed lens and the rest of the optical train, e.g., L2 or L4 in the five lens embodiment or L2, L3, L5 or L6 in the seven lens embodiment. Still other embodiments involve movable lenses at one or both ends of the optical train.

Contrary to perceived expectation, it transpires that to achieve a similar focus range to a conventional auto focus camera, the middle lens in the example of FIG. 2A is moved a relatively short distance, typically around 100 um. This makes possible the use of novel forms of actuator, such as MEMS, to move the lens and a number of consequential benefits arising from the inherent characteristics of such devices. Of the many benefits of this design, small size, low power consumption, low noise, high speed and high accuracy of movement and other improvements are provided.

FIG. 2B also schematically illustrates a cross-section through an auto focus zoom camera in accordance with certain embodiments that utilizes assembly with the lens train fabricated as a pre-aligned unitary component. The image sensor 201 resides on a substrate 202 to which is attached a sleeve 203. The sleeve has a screw thread 204 in the example illustrated at FIG. 2B. The holder 205 containing the lens train 206 has a mating screw thread 207. Rotating the holder with respect to the sleeve moves the entire lens train, in this example embodiment, along the optical axis 208 of the camera, permitting the focus to be set. Alternatives to the matching screw threads 204 and 207 include matching grooves and lands in various patterns permitting focus to be set continuously or discretely such as with a series of notches, spring-loaded pins or levers or elastic materials or other techniques to couple the lens train holder 205 with the sleeve 204 in a way that allows the distance between the image sensor 201 and one or more fixed lenses of the lens train 206 to be set.

A precision alignment in accordance with certain embodiments of the optical train permits transmission of images at high fidelity. Certain embodiments involve alignment of the various elements of the train, principally the lenses, with respect to tilt, centering and rotation with respect to one another to a certain degree of accuracy. While it is possible to achieve very exact alignment of one lens to another using active alignment techniques in certain embodiments, passive methods are used in certain embodiments, and typically wherever possible, due to the high speed of assembly and low cost of this approach. In the auto focus zoom module of certain embodiments, passive alignment tolerances are accommodated in all but one of the joints of the lens train.

Figure 3:
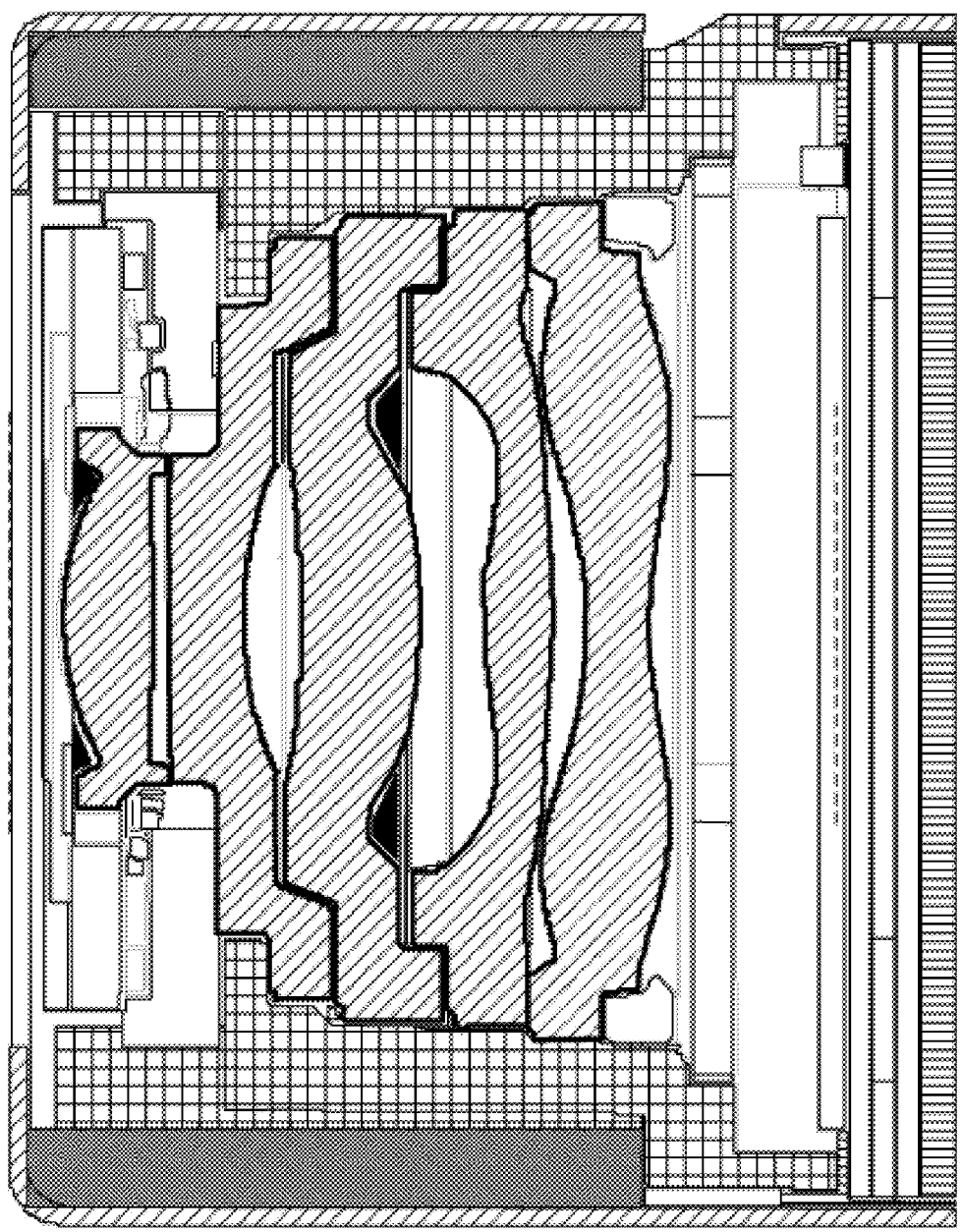
FIG. 3 schematically illustrates another example of an auto focus camera module including a different subset of one or more movable lenses and a MEMS actuator in accordance with certain embodiments.

In another embodiment, an auto focus camera may have an entire optical train that is moved in an auto focus process. In addition, advantageous cameras in accordance with embodiments described herein that include optical trains with both a movable component and a fixed component may be configured in accordance with many other examples than those illustrated at FIGS. 1 and 2A-2B. For example, the auto-focus camera module example illustrated schematically at FIG. 3 includes a MEMS actuator coupled to the furthest lens L1 from the image sensor or at the image end of the optical train. A lens barrel including L1-L4, L1-L3, L1-L2 or even just one lens L1 (or L3 as in FIGS. 2A-2B, or L2, or L4, or even L5 is some embodiments or in other embodiments only three or four lenses are included in the optical train, or in others six or seven lenses are included) may be movable using different camera module embodiments of different numbers of lenses and/or different configurations of lenses, with this MEMS actuator location. The MEMS actuator may be electrically coupled at this most imageward lens L1 of the lens barrel using one or more conductive traces that follow within a camera module bracket outside the lens barrel to the flexible printed circuit that is coupled to the camera module at the sensor end or using a flexible printed circuit extension that couples electrically to the actuator contact pads at the image end of the camera module while the sensor end is still connected to the FPC at the second location. These advantageous auto focus zoom cameras have one or more parts of the optical train fixed and one or more parts moving. In certain embodiments, cameras exhibit exactitude of centering and tilt alignment of the moving lens to the fixed lens that differs from conventional fixed or auto focus cameras.

Camera modules in accordance with several embodiments are schematically illustrated by way of example physical, electronic and optical architectures herein and within other patent applications by the same assignee or other patents. For example, other camera module embodiments and embodiments of features and components of camera modules that may be included with alternative embodiments are described at U.S. Pat. Nos. 7,224,056, 7,683,468, 7,936,062, 7,935,568, 7,927,070, 7,858,445, 7,807,508, 7,569,424, 7,449,779, 7,443,597, 7,768,574, 7,593,636, 7,566,853, 8,005,268, 8,014,662, 8,090,252, 8,004,780, 8,119,516, 7,920,163, 7,747,155, 7,368,695, 7,095,054, 6,888,168, 6,583,444, and 5,882,221, and US published patent applications nos. 2012/0063761, 2011/0317013, 2011/0255182, 2011/0274423, 2010/0053407, 2009/0212381, 2009/0023249, 2008/0296717, 2008/0099907, 2008/0099900, 2008/0029879, 2007/0190747, 2007/0190691, 2007/0145564, 2007/0138644, 2007/0096312, 2007/0096311, 2007/0096295, 2005/0095835, 2005/0087861, 2005/0085016, 2005/0082654, 2005/0082653, 2005/0067688, and U.S. patent application No. 61/609,293, and PCT applications nos. PCT/US12/24018 and PCT/IB12/00381, which are all hereby incorporated by reference.

MEMS Actuator

A MEMS actuator is coupled to L3 in the example of FIGS. 2A-2B (and to the movable lens group L1-L4 in the example of FIG. 1) to provide auto focus capability in certain embodiments. In other embodiments, a voice coil motor (VCM) or a piezo actuator may be used to provide movement capability.

Suitable MEMS actuators are described in several of the US patents and US patent applications incorporated by reference herein, e.g., see U.S. patent application Ser. No. 61/622,480. Another MEMS actuator having a somewhat different design is described in US-PCT application no. PCT/US12/24018. Both of these US patent applications are incorporated by reference, and other examples of MEMS actuators and components thereof are cited and incorporated by reference below as providing alternative embodiments. Such actuators can be fabricated in silicon or substantially polymeric materials and have a stroke of around 100 um. They also exhibit a number of other beneficial characteristics, which are conferred on an auto focus zoom camera module of the type described. These include, very low power consumption, fast and precise actuation, low noise, negligible particulate contamination and low cost.

A MEMS actuator in accordance with certain embodiments may be thought of as generally a unidirectional device, setting aside for the moment any centering or tilt alignment movements that may be ascribed to an actuator component, even though advantageous alignment in three dimensions is provided by MEMS actuators in accordance with certain embodiments. That is, a MEMS actuator in accordance with certain embodiments has a rest position and the actuator can be driven from that rest position in one dimension, i.e., when being utilized in performing an auto-focus feature. This has a benefit for the assembly of auto focus camera modules in that it permits the entire lens train, or a substantial portion thereof, to be assembled as a pre-aligned unitary component. For subsequent assembly and calibration steps, it can then be handled similarly to or in exactly the same manner as the lens train of a fixed focus camera, namely the focus can be set by inserting a holder, containing the lens train into a sleeve fixed over the image sensor. In certain embodiments, the holder and sleeve are coupled by a screw thread.

Camera Module with Protective Cover

In certain embodiments, an optical surface can be added to the image sensor as a singulated component. This optical surface can serve as a cover, made of transparent glass or polymer, to prevent dust or other contaminant from the reaching the active surface of the sensor, while permitting visible light to get through to the sensor. The optical surface can also serve as an infrared (IR) filter, particularly for a silicon sensor. An IR absorbing material may be used for the cover or an IR coating may be applied to the glass or polymeric or other optically transparent protective cover. The optical surface can also be formed to provide optical power such as in the shape of a replicated lens L1, as in the examples of FIGS. 4A-4B, where the IR filter could also be disposed between the sensor and the lens L1 (not shown, but see U.S. Ser. No. 13/445,857, which is incorporated by reference). A process for forming the singulated component at the wafer stage before dicing is described only briefly hereinbelow, and in more detail in the '857 application.

Figure 4A:
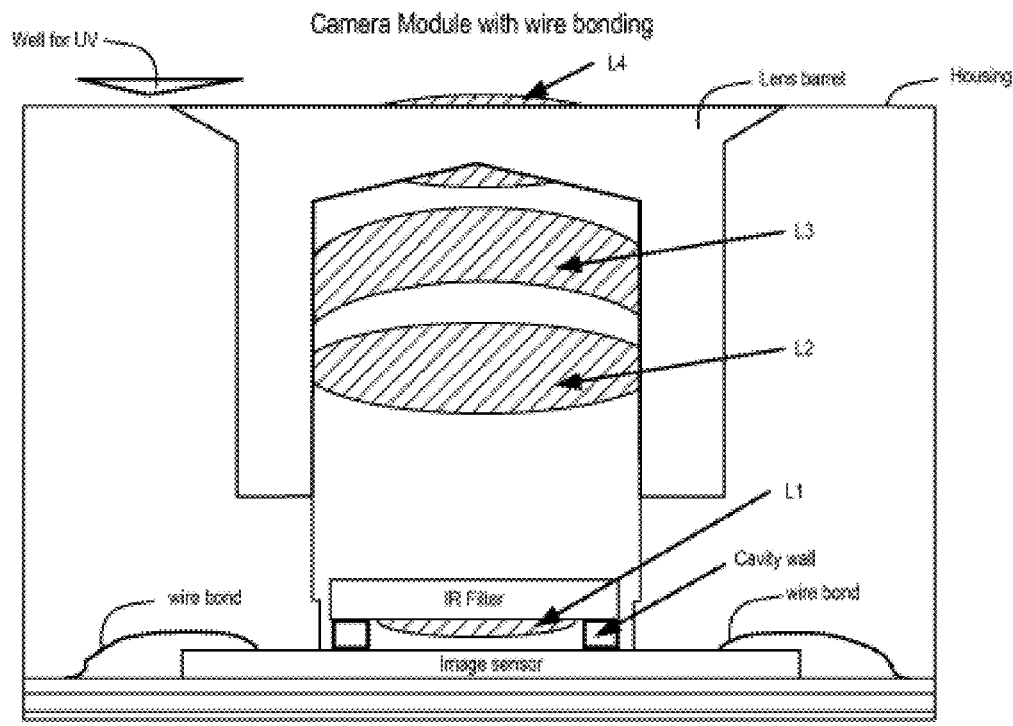
FIG. 4A schematically illustrates a cross sectional view of an example of an auto focus camera module including a wire bond image sensor configuration in accordance with certain embodiments.
Figure 4B:
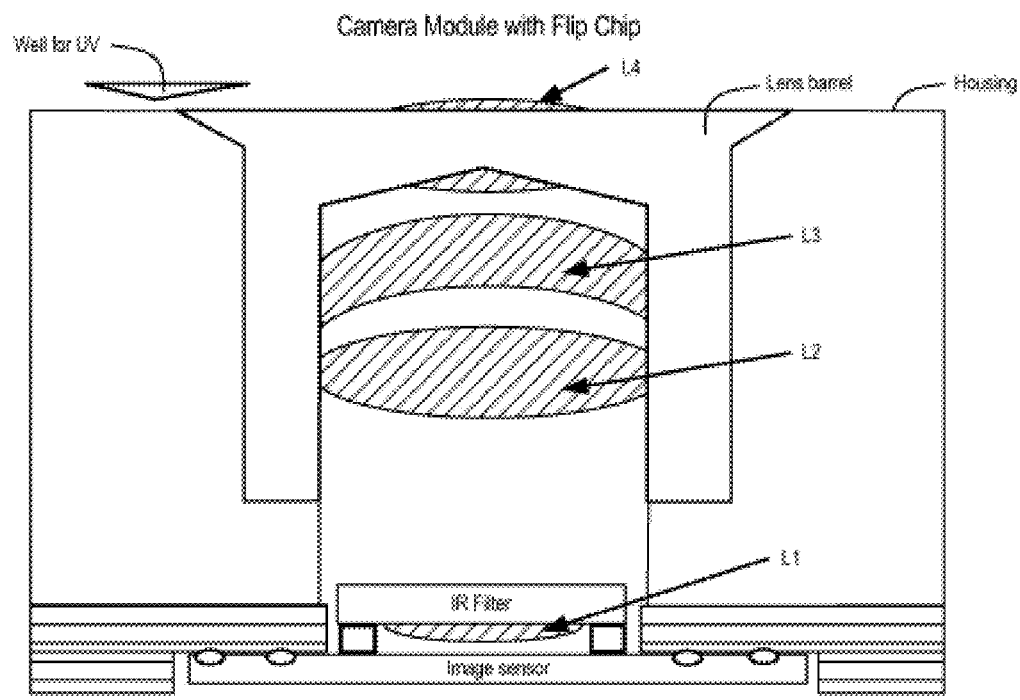
FIG. 4B schematically illustrates a cross section view of an example of an auto focus camera module including a flip-chip image sensor configuration in accordance with certain embodiments.

A singulated component is shown in FIGS. 4A-4B including an active image sensor that is protected against contamination, e.g., using wafer level hybrid optics. This approach has another advantage in that an overall physical Z height of the camera module, i.e., along optical path, normal to sensor plane, may be reduced by incorporating such hybrid optics with the camera module component.

The active image area on the image sensor is protected in accordance with certain embodiments at the wafer stage before dicing or singulation of the image sensor wafer into discrete dies. This protection of the active image area is achieved in certain embodiments by attaching a glass wafer, such as a blue glass or IR coated glass, or other material such as a polymer or other material that is transparent to visible light and absorbs or otherwise blocks IR light. Further improved functionality of this glass protection may be achieved by adding a wafer level optics element as in the examples of FIGS. 4A-4B.

FIG. 4A schematically illustrates an example camera module that includes a wire bond coupled to the camera module component. FIG. 4B schematically illustrates an example camera module that includes a flip-chip. The example camera module illustrated schematically at FIG. 4B may use thermal compression or a thermosonic process. These are described in example embodiments in more detail at U.S. patent application Ser. No. 13/445,857, which is incorporated by reference.

In auto focus and optional zoom camera modules in accordance with various embodiments, processor-based components such as distortion correction components, chromatic aberration correction components, luminance, chrominance, and/or luminance or chrominance contrast enhancement components, blur correction components, and/or extended depth of field (EDOF) and/or extended or high dynamic range (EDR or HDR) components.

Figure 5A:
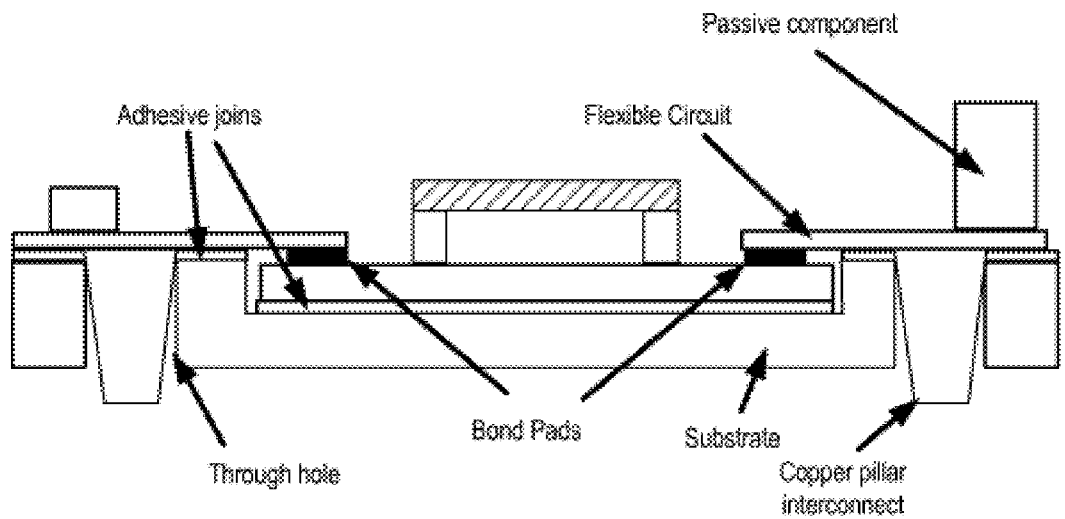
FIG. 5A schematically illustrates a section view of another camera module with copper pillar interconnects in accordance with certain embodiments.
Figure 5B:
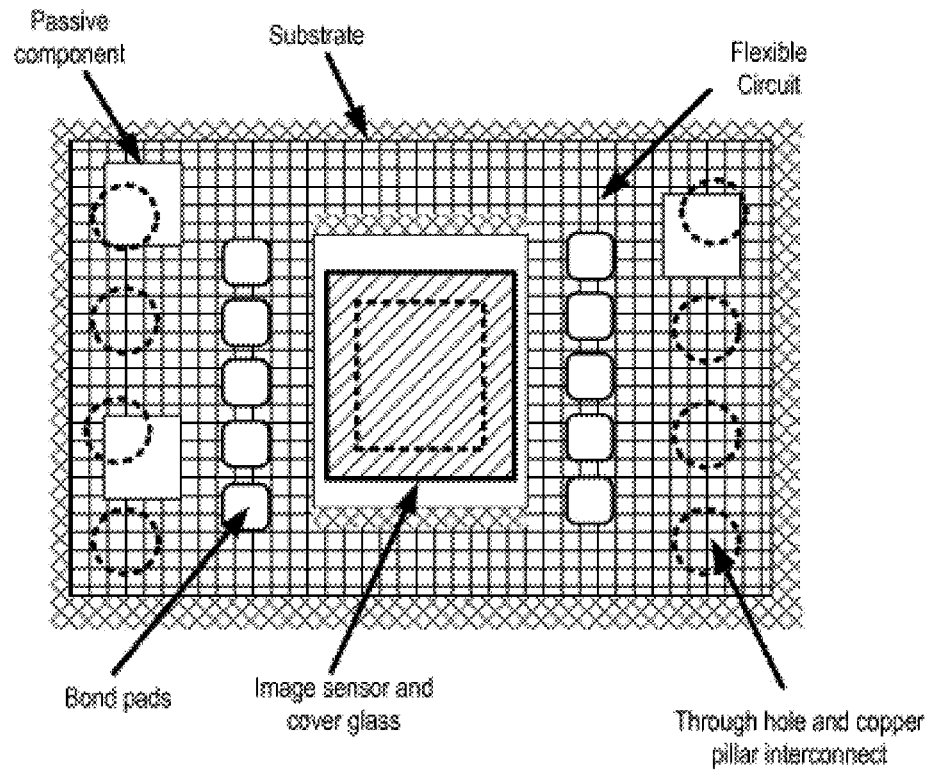
FIG. 5B schematically illustrates a plan view of the camera module of FIG. 5A.

Another example is illustrated schematically at FIG. 5A and FIG. 5B, and is also described in detail at the Ser. No. 13/445,857 US application incorporated by reference above. FIGS. 5A-5B include examples of structural components of camera modules in accordance with certain embodiments that are illustrated in section and plan view, respectively. A flat substrate forms the base of the camera module of FIGS. 5A-5B. A purpose of this substrate is to provide structural support, and so suitable materials include metals (e.g., titanium), ceramics (e.g., alumina) and hard polymers like Bakelite. The substrate material may be moulded or one or more other methods may be used to fabricate an array of through-holes in it. In certain embodiments, these through holes will eventually be fully or partially filled with conductive material as part of the structure that provides the electrical interface to the camera module. Because the substrate contributes to the overall height of the camera module, it is a very thin yet sufficiently rigid. The mechanical properties of the material of the substrate, including its modulus and fracture toughness, are carefully selected in certain embodiments. The substrate may be around 200 microns thick, and can have a thickness be in a range between approximately 50 microns and 400 microns.

The image sensor and cover glass are coupled over roughly a central portion of the substrate in the example embodiment illustrated at FIGS. 5A-5B. The image sensor may be attached to the substrate using adhesive bonding or magnetically, or using one or more clips or complementary slide or twist fastening components, or using fit bonding utilizing static adhesion or thermal or compression shrink or expansion fitting, or otherwise. Over a substantial portion of the remainder of the substrate, in this example, is attached a flexible circuit. The method of attachment may be adhesive bonding or one of the just mentioned methods or otherwise. The flexible circuit may include in certain embodiments thin conductive tracks made of copper or other metal or conducting polymer on the surface of and/or embedded within a soft polymeric material like polyimide. Apertures or other features may be used to provide access to the copper tracks to make electrical connections.

As illustrated in the example of FIGS. 5A-5B, the flexible circuit has an aperture that is smaller than the image sensor in plan area. This permits the flexible circuit to be placed over the image sensor, such that the bond pads on the image sensor are covered by the flexible circuit. In this way, electrical joins may be made between the bond pads on the image sensor and suitable lands on the flexible circuit. A wide choice of methods and materials are used in accordance with several embodiments to effect such joins, with examples including conductive adhesives, thermo-compression bonds, soldered joints, and ultrasonic welds.

The image sensor is connected or connectable electrically to the flexible circuit, enabling tracking on a flexible circuit in accordance with certain embodiments to be used to route electrical connections to other sites, which may include active and/or passive components. Active and/or passive components can be attached and interconnected to the flexible circuit in various embodiments using established methods and techniques. In FIGS. 5A-5B, three (3) passive components are included in the camera module, along with ten (10) bond pads and eight (8) through-hole solder interconnects, but these numbers and locations and shapes and sizes are provided by way of illustration and many variations are possible.

External electrical connection to the camera module involves in certain embodiments electrical connection to suitable lands on the flexible circuit. By design, these lands are advantageously located over the through holes in the substrate. Although FIGS. 5A-5B depict pillars of copper for these electrical interconnects, the electrical interconnects could be fabricated from a variety of materials and structures including solder pillars, stacked stud bumps, conductive adhesives and/or deep access wire bonds. Other embodiments include mechanical structures like sprung elements and pogo pins. Where solder pillars are used, on reflow of the solder, the periphery will change shape into a hemisphere so that the external interface of the camera module resembles an interconnect for semiconductor packages similar to a ball grid array. The example structure shown in FIGS. 5A-5B includes a flat flexible printed circuit, although in other embodiments has one or more slight bends and in others the FPC is bent into a U-shape.

FIGS. 5A-5B schematically illustrate an image sensor that is disposed in a recess in the substrate, such that image sensor bond pads are on the same level as the underside of the flexible circuit, although in other embodiments, these may be offset. Some adjustment to the detail of this alignment may take into account the thickness of the joining medium used to attach and connect the flexible circuit to the bond pads.

Camera Module Overview Example

Figure 6A:
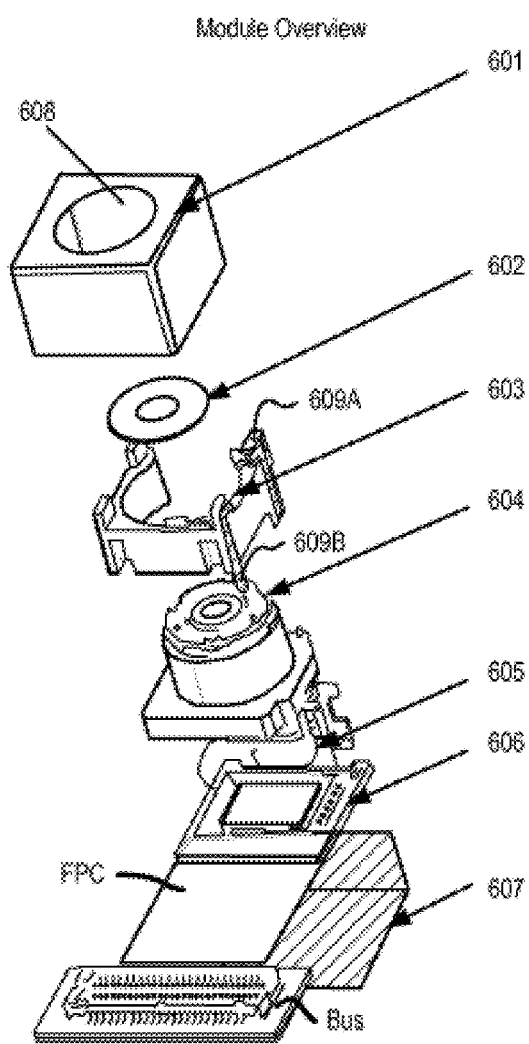
FIGS. 6A-6C schematically illustrate an exploded view, an overhead or top view and a side view, respectively, of a camera module with certain peripheral and/or internal components in accordance with certain embodiments.
Figure 6B:
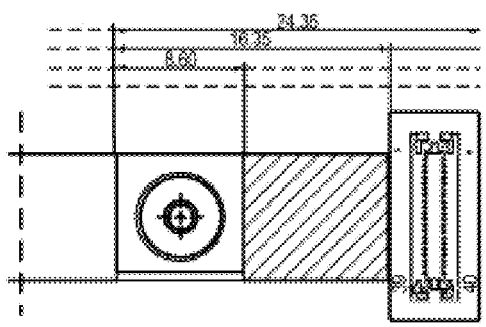
Figure 6C:
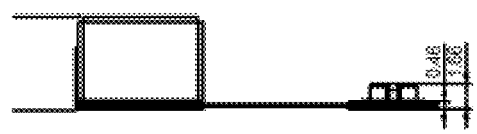

FIGS. 6A-6C illustrate in an exploded view, an overhead view and a side view, respectively, an example of a camera module including certain components that may be included along with the image sensor and optical train components in an illustrative overview example. The other components shown in FIG. 6A include an EMI shield or EMI housing 601, a light leak baffle 602, a lens barrel bracket 603, an actuator and lens barrel assembly 604, a blue glass or other IR filter component (particularly for silicon sensor embodiments) 605, a sensor component 606 (shown coupled to a flexible printed circuit FPC with a bus connector), and a bottom sponge 607.

The module size may be less than 10 mm on each side, and in certain embodiments less than 9 mm on each side, and in the X and Y directions (plane of the image sensor, normal to optical path) certain embodiments may be 8.6 mm or even 8.5 mm without EMI tape, and in the Z direction (parallel to optical path, normal to sensor plane) certain embodiments may be less than 8 mm or less than even 7 mm and in certain embodiments less than 6.5 mm or 6.4 mm, e.g., 6.315 mm with EMI tape, or less than 6.3 mm without EMI tape, e.g., 6.215 mm.

The components 601-607 are described and summarized below with reference to FIGS. 6A-6C. Reference may be made to U.S. patent application Ser. Nos. 13/571,395, 13/571,405, 13/571,397, and/or 13/571,393; which are incorporated by reference. The light leak baffle 602 is shown in the example of FIG. 6A as having an outer baffle diameter that approximately matches a diameter of a focus adjustment aperture 608 defined at an object end of the camera module. An inner baffle diameter is large enough to permit images to be captured by the camera with certain exposure to pass through, but small enough to block unwanted light. In another embodiment, the outer diameter of the light leak baffle 602 may be larger than the aperture 608, but the EMI housing material that overlaps the baffle 602 may be much thinner than the rest of the EMI housing 601 or the EMI housing material that overlaps the baffle may be raised in either case sufficient to permit the movement of the lens assembly, e.g., of the example of FIG. 1 or FIG. 3, to the end of its range. A light leak baffle 602 in accordance with certain embodiments has an EMI shield characteristic that supplements the EMI housing at the focus adjustment aperture 608.

The IR filter 605 is shown as a separate component in FIG. 6A that fits or is coupled or disposed on or spaced slightly from the sensor, while as mentioned above, the IR filter 605 also may be formed at wafer level together with the sensor and coupled to the sensor to form a cavity by cavity walls, while optionally also a lens nearest the image sensor, e.g., L5, is also formed at wafer level with the sensor and IR filter in the embodiments described above.

The sponge 607 is shown in the example of FIG. 6A in L shape which may be U shape and may be four sides, and a fifth side may have a space to permit the FPC to protrude just through it or under it, e.g., approximately coplanar with the top of the bottom sponge in certain embodiments including the example of FIG. 6A. Conductive traces 609A and 609B are also shown running from the bottom of the bracket where they are connectable to the FPC to the top of the bracket where they are connectable to actuator pads for energizing and controlling the actuator to move the lenses for autofocus.

Electromagnetic Interference (EMI) Housing

Figure 7:
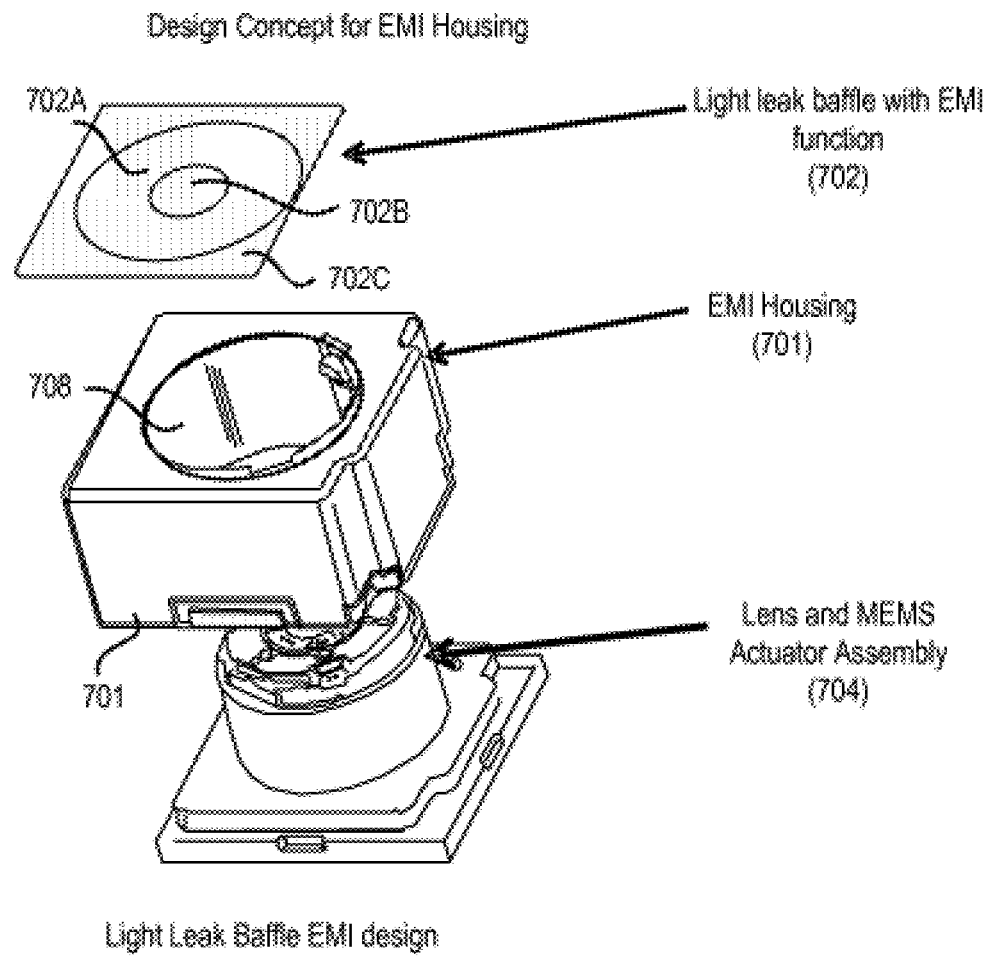
FIG. 7 schematically illustrates an exploded view of a camera module including a housing that serves as an electromagnetic interference (EMI) shield, or an EMI housing, and permits movement of an enclosed lens barrel through a focus-adjustment aperture, and a light leak baffle defining a camera aperture or that bounds or surrounds a camera module aperture or otherwise blocks undesired stray light from entering or exiting the camera module through the first aperture while transmitting desired exposures.

FIG. 7 schematically illustrates an exploded view of an example of an auto-focus camera module in accordance with certain embodiments that includes an EMI housing 701 that physically contains optical and electronic components such as Lens and MEMS actuator assembly 704, e.g., including an optical train including multiple lenses and a MEMS actuator. The EMI housing 701 serves as an electromagnetic interference (EMI) shield for components contained therein. In one embodiment, the EMI housing is made of a conducting or semiconducting material, or includes a conducting or semiconducting layer over a polymer or other insulating, durable frame. The EMI housing 701 of the example autofocus camera module of FIG. 7 also advantageously permits movement of an enclosed lens barrel, or at least one or more lenses at the object end of the optical train, through a focus-adjustment aperture at the object end of the camera module.

Light Leak Baffle with EMI Function

The light leak baffle 702 couples to the outside of the housing 701 in this example embodiment, e.g., using an adhesive, such as conductive glue. The light leak baffle may have EMI characteristic portion 702A that overlaps aperture 708 in the Z direction parallel to the optical path of the camera module. The aperture 702B defined in the light leak baffle is surrounded by EMI portion 702A, while an outer portion 703C that overlaps material of the EMI housing 701 in the Z direction may or may not have EMI characteristic. As illustrated in the example of FIG. 6A, the outer portion is 703C is optional particularly if another way to couple the light leak baffle 602, 702 in its place along the Z axis permitting outward movement of the movable lens or lenses or lens barrel of the optical train in a focusing movement such as an auto-focus search, while being aligned in the X-Y plane to permit images of desired exposures and sharpness to be captured by the camera module, such as to couple the light leak baffle 602, 702 to the object-most end of the movable lens or lenses or lens barrel.

The light leak baffle 702 in accordance with certain embodiments is schematically illustrated in the exploded view of FIG. 7 as coupling to the top of the EMI housing, e.g., using an adhesive such as conductive glue or alternatively one or more passive alignment clips or a combination thereof. The light leak baffle may include a layer of conductive material such as carbon feather, or 2D carbon or graphene, or a thin conducting polymer, or a metal, or a combination of an insulator with a conducting layer, or alternatively the light leak baffle 702 may be made of the same material as the EMI housing except that it may be raised to permit the movement of the lens barrel or it may be separately attached by adhesive or clip. The light leak baffle 702 may define a camera aperture or may bounds or surround a camera module aperture or otherwise block undesired stray light from entering or exiting the camera module through the first aperture while transmitting desired exposures.

The camera module of FIG. 7 may include an EMI housing containing a multiple lens and MEMS actuator assembly and/or an EMI housing coupled to a lens and MEMS actuator assembly, or combination thereof. The EMI housing may include a light leak baffle 702 that comprises a carbon feather or other conductive material having EMI shield characteristic.

FIGS. 8A-8C schematically illustrate a camera module, with before-FPC bending perspective, during-FPC bending overhead, and after-FPC bending rotated perspective views, respectively, in accordance with certain embodiments. The camera module 801 is physically and electronically coupled at the sensor component to a bendable, flexible printed circuit (FPC) 802 at a sensor connection segment 802A in FIG. 8A. Certain electronics 803 may be coupled to a side segment 803A where those electronics fit into an empty space due to, for example, use of a U-shaped bracket or internal EMI housing framework that leaves a space at one side that is filled with the electronics 803 and enclosed by the side segment 803A of the FPC 802. An accelerometer and/or an orientation sensor may be included at a portion of the empty space there too (see, e.g., U.S. Ser. Nos. 61/622, 480 and 61/675,812, which are assigned to the same assignee and incorporated by reference). The FPC 802 in the embodiment of FIG. 8A also includes an FPC extension 804, which may be an end segment or just a FPC segment 804 displaced from the sensor connection segment 802 a precise amount after the sensor connection segment and side segment 803. The FPC extension segment 804 includes two or more conductive side pads 804A for electrically contacting actuator pads at the image end of the lens barrel of the camera module. The FPC extension 804 or end segment may define a partial, semicircular or full cut-out 805 to overlay the aperture of the camera module so that desired imaging rays are not blocked from entering the camera module, and so that undesired rays are blocked further out from the central part of optical path. The FPC 802 may connect to the sensor end of the camera module at a FPC end segment in an alternative embodiment, and bend around to connect to the actuator pads and continue to its connections external to the camera module from the actuator connection segment 804 (instead of as shown from the sensor segment 802A). The FPC extension 804 may have EMI shielding properties like any of the example light leak baffles 602, 702, or FIGS. 6A-7 referred to above.

FIGS. 9A-9B schematically illustrate a camera module in accordance certain embodiments, before and after FPC bending, similar to the embodiments just described with reference to FIGS. 8A-8B, respectively. The FPC 901 is configured to physically and electrically connect to a sensor end of the camera module 902, and to electrically connect to actuator contacts 903 with sufficient physical coupling stability using interleaving and/or clasping hook attachments or other passive complementary features on the actuator end such as FPC conductive pad cutouts 904 and raised actuator control contact pads 903 and/or dedicated physical coupling protrusions and/or cutouts. The same FPC segment 905 that includes the actuator pad conductive contacts 904 may have an aperture 906 configured to serve as or couple to a light leak baffle, e.g., as alternative to the light leak baffles 602, 702 of the embodiments described with reference to FIGS. 6A-7, and more similar to the embodiment of FIGS. 8A-8B. In the embodiments of FIGS. 8A-8B, as well as those of FIGS. 6A-7, room is provided in the Z direction for movement of a lens group that provides advantageous auto-focus range, while light that would otherwise leak in the gap between the outer optic and auto-focus aperture (e.g., aperture 708 of FIG. 7) when the outer optic is not extended through the auto-focus aperture. As with the earlier embodiments, the FPC segment 905 may have an EMI shield property that makes it multi-advantageous and multi-functional.

Figure 10A:
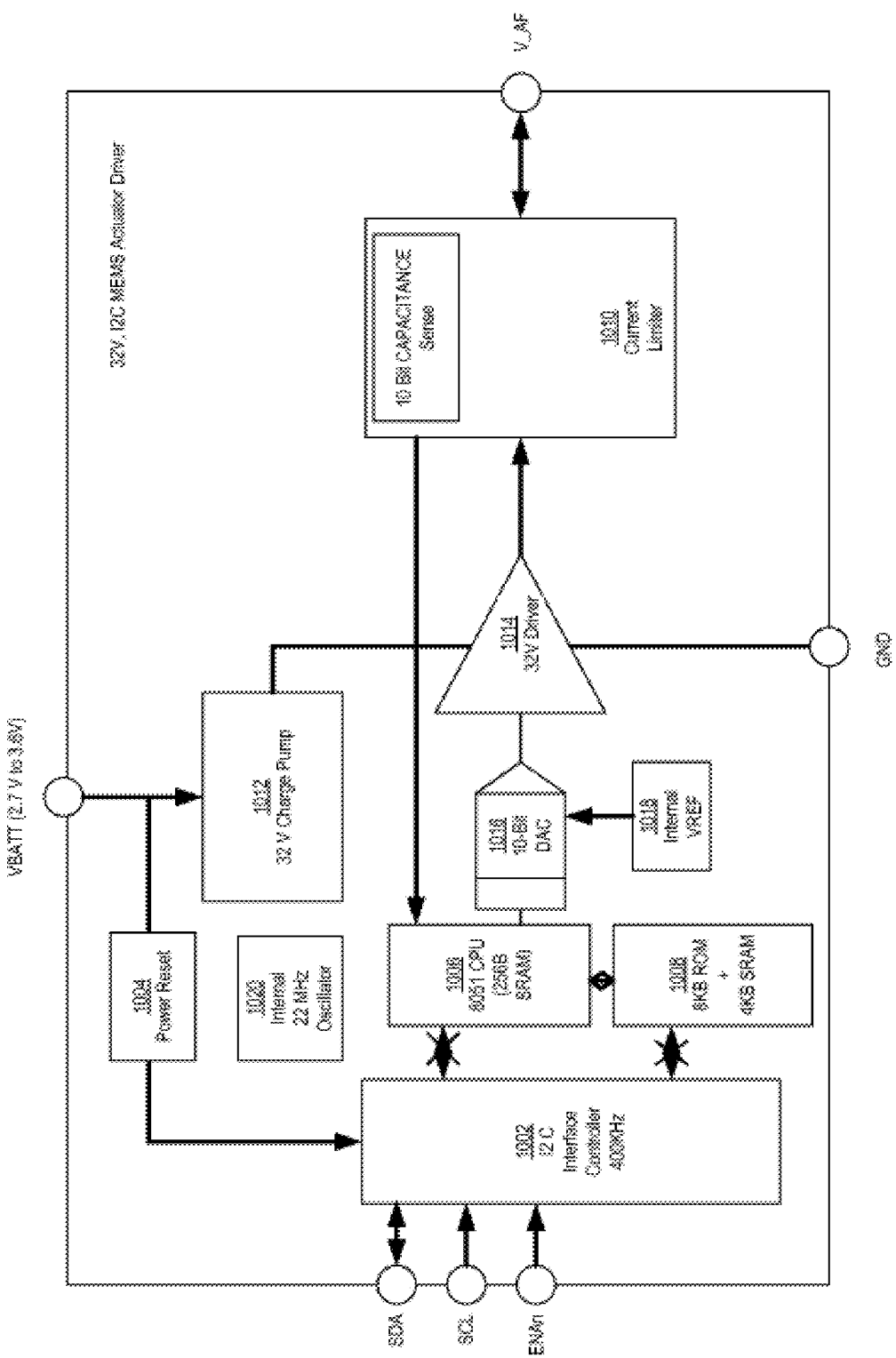
FIGS. 10A-10B schematically illustrate examples of a MEMS actuator driver and a pin package therefor, respectively, in accordance with certain embodiments.
Figure 10B:
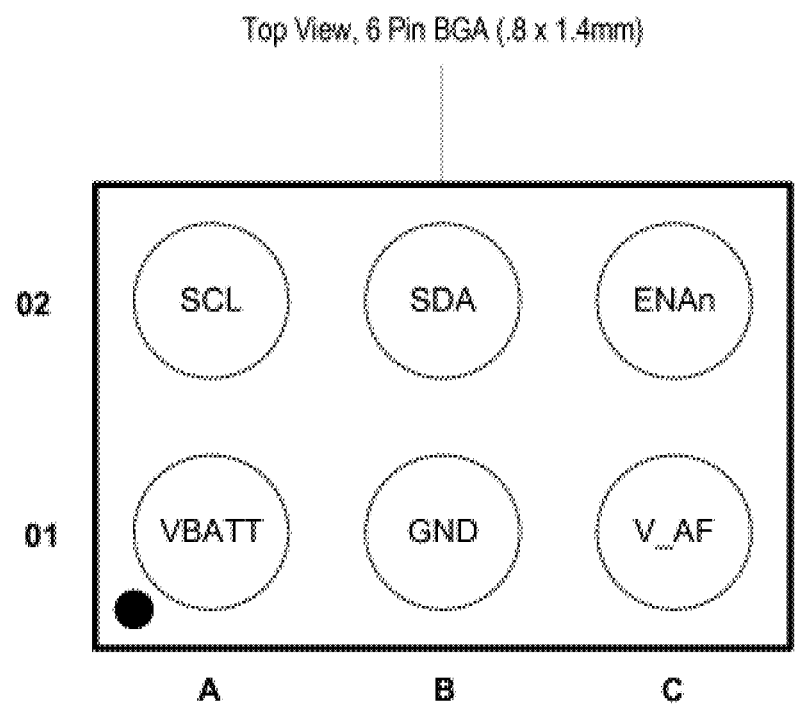

FIGS. 10A-10B schematically illustrate examples of a MEMS actuator driver and a pin package therefor, respectively, in accordance with certain embodiments. A MEMS actuator driver IC in accordance with certain embodiments is configured for high volume, production, and digital imaging camera focus element purposes. The MEMS driver may be configured for use in conjunction with a proprietary MEMS element that is used in a focusing system, e.g., a fast auto-focus system, mounted on a digital camera or camera module assembly that may be used in cell phones, PDAs, and various computer systems such as desktop and laptop PCs and equivalents, tablets, mini-tablets and other camera-enabled devices, and may be coupled as monitoring imagers in automobiles or elsewhere. Referring to FIG. 10A, an example of a MEMS actuator driver in accordance with certain embodiments includes an I2C interface controller 1002, e.g., 400 kHz, including SDA, SCL and ENAn pin inputs and a power reset input 1004. The I2C interface controller may communicate with a CPU 1006, such as an 8051 CPU, e.g., 256B SRAM, and ROM and RAM components 1008, e.g., an 8 KB ROM, and a 4 KB SRAM. The CPU 1006 may receive input from a current limiter 1010, e.g., a 10 bit capacitance sensor. The current limiter 1010 may have a V_AF pin input.

The example MEMS actuator driver illustrated at FIG. 10A may have a charge pump 1012, e.g., 32 Volt, that has a VBatt pin input, e.g., 2.7V to 3.6V. The battery system is configured in certain embodiments to be used to run internal logic systems, analog acquisition systems, power-on-reset, and internal voltage reference. The charge pump 1012 and a ground GND pin serve as inputs to a 32V driver 1014.

The example MEMS actuator driver illustrated schematically at FIG. 10A may also include a DAC, e.g., 10-Bit, connected between the CPU 1006 and the driver 1014. The DAC 1016 may have an internal Vref input 1018. In certain embodiments, an I2C bus slave controller is provided to access internal registers within the MEMS driver IC. The external I2C host is able to read internal registers and write internal registers. The data in certain embodiments includes an 8 bit data format.

An internal 8 bit CPU (8051 based) system is configured with 8 Kbytes of ROM data, 4 Kbytes of SRAM for program data and Data Memory. Internally to the 8051, fast 256 bytes of SRAM/Register data is provided in certain embodiments to perform closed loop capacitance feedback for position control of the MEMS Lens assembly. The CPU is configured to take care of internal control, linearization, position to capacitance conversion and calibration of the MEMS system. The CPU is configured to run a "State Space" control loop to maintain proper positioning of one or more lenses of an optical train of a MEMS actuated auto-focus camera module in accordance with certain embodiments. The CPU is configured to employ an algorithm to allow the driver IC to determine position of the camera at all times. The processor is clocked at a minimum of 5.5 MHz.

A ladder type of charge pump is internally designed in certain embodiments to support up to a 32V voltage source for a low (10 uA) current voltage driver. The low current voltage driver has in certain embodiments a functional operation to drive the MEMS element. The voltage level is controlled via I2C through an internal register and a 10 bit DAC. The DAC has a smoothing filter (e.g., implemented in Firmware) in the front end to prevent fast voltage edges on the output driver. The voltage driver output is current protected. In addition, the output element has an on-demand capacitive measurement circuit. The capacitance is not continually measured in these embodiments, but is sampled to measure the MEMS distance for auto-focusing. This capacitive circuit converts a measured capacitance on the driver pin to a 10 bit digital register that is available to be read via the I2C bus.

The example MEMS actuator driver illustrated schematically at FIG. 10A may also include an internal oscillator 1020, e.g., 22 MHz. The 22 MHz oscillator is provided in certain embodiments to derive 400 KHz I2C read out timing and provide timing for internal functions.

FIG. 10B schematically illustrates a top view of an example pin package for the MEMS actuator driver of FIG. 10A. The pin package may include a six pin ball grid array (BGA). In certain embodiments, those six pins may include a serial clock input (SCL), e.g., zero to 3.6 Volts, a serial data (SDA), e.g., bidirectional pin having an open drain and zero to 3.6 Volt range, an enable pin (ENAn), e.g., active low zero Volts may enable the device while high level 3.6 Volts may be shut down mode, a power terminal input (Vbatt), e.g., 2.5-3.6 Volts, a ground terminal (GND), e.g., zero Volts, and an auto-focus voltage output pin (V_AF), e.g., that may have a minimum between zero Volts and 10 Volts and may have a maximum between 31.5 volts and 36 Volts. The package height in one embodiment is 0.33 mm, and the package length and width may be 1.8 mm and 0.8 mm, respectively, while a ball pitch may be 0.4 mm.

With regard to the auto-focus voltage output pin driver, a current drive and current limiter may have maxima at 10 microAmps at 31 Volts, and at 30 microAmps, respectively. An amplifier slew rate and setting time may be minimum 3V/ms and maximum 200 microSeconds, respectively. An amplifier offset and bandwidth (−3 db) may be maximum 10 milliVolts and minimum 150 Hz, respectively. An output capacitance, DAC resolution and output accuracy may be maximum 10 picoFarads, 10 bits and +/−2% full scale, respectively.

With regard to the auto-focus voltage output pin capacitance measurement, a charge pump output ripple 50 kHz-1 MHz may have a maximum 100 nV ripple, and a charge pump power up time maximum of 2 ms. An auto-focus driver frequency during a capacitance measurement may be between 10 kHz and 1 MHz, and a capacitance measurement driver voltage at 10 kHz may have a maximum 10 mV. The output capacitance resolution may be 10 Bits, and a measurement capability may be between 25 pF and 300 pF. An output capacitance accuracy and measurement time may have maxima of +/−20% and 50 microseconds, respectively.

Figure 11:
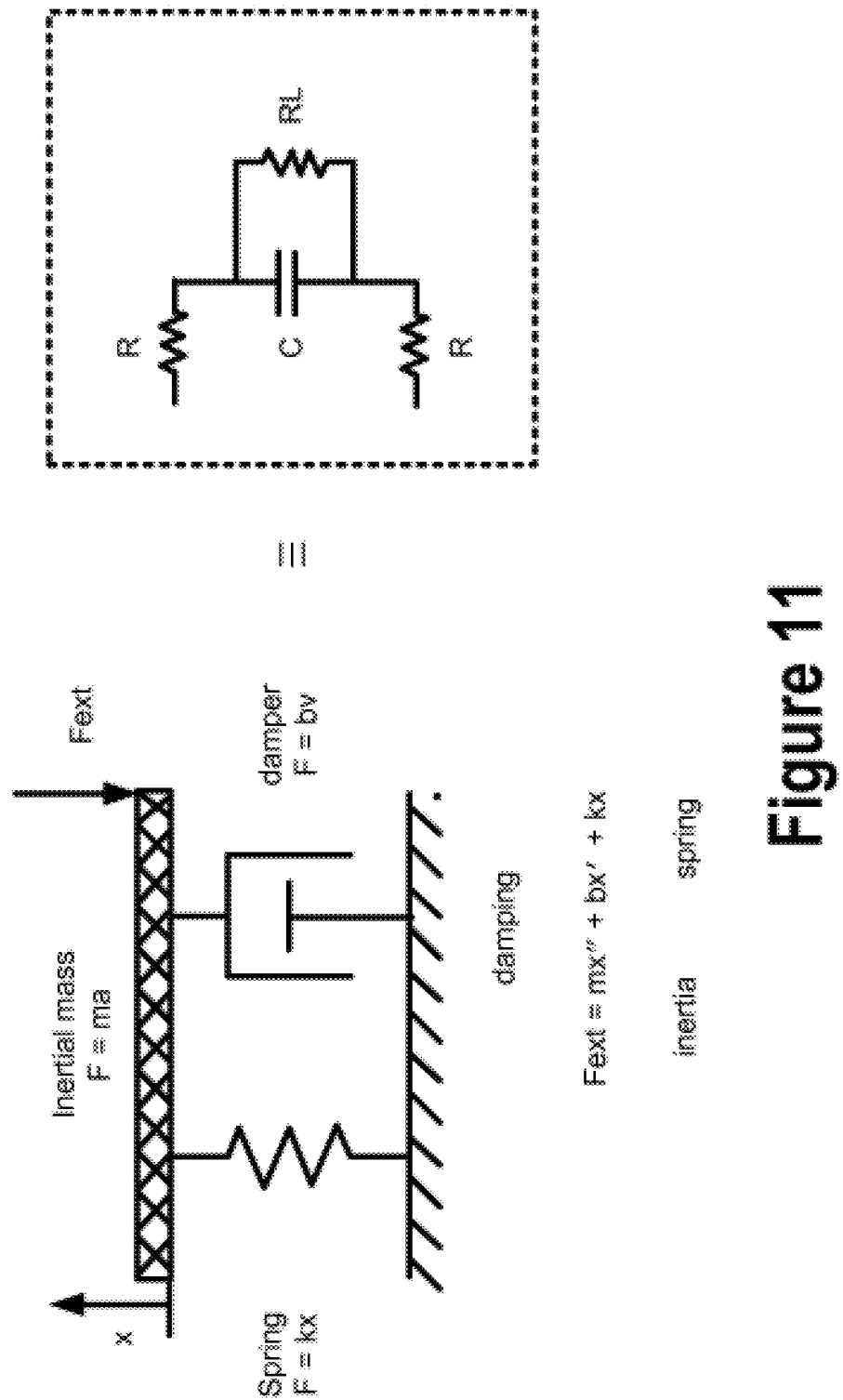
FIG. 11 schematically illustrates an example of an apparatus for converting voltage to displacement for a MEMS focus actuator of a camera module in accordance with certain embodiments.

FIGS. 11A-11B schematically illustrate examples of a mechanical and/or electrical apparatus for converting inertia or voltage, respectively, to displacement for a MEMS focus actuator of a camera module in accordance with certain embodiments. An external force Fext may be generated as an electrostatic force between actuator capacitor plates in response to an input voltage. The external voltage Fext for the system of FIG. 11A may distribute according to the common representation of inertial, dampling and spring forces: Fext=ma+bv+kx. An electrical diagram as in the example of FIG. 11B may include a contact resistance R, a leakage resistance RL and a capacitance C which may be a function of actuator displacement.

A mechanical displacement/force transfer curve for a MEMS auto-focus actuator may have a lightly-damped complex conjugate pole, e.g., with a maximum Q of 4. Example value ranges for the components identified in FIG. 11B may include MEMS capacitance between 25 pF and 300 pF, a lead resistance R maximum of 20 k, and a leakage resistance RL minimum 100 MOhm. The MEMS actuator may also have maximum voltage, transient current (nominal 3 microAmps) and resonance frequency (nominal 100 Hz) of 32V, 7 microAmps and 140 Hz, respectively. A minimum resonance frequency (nominal 100 Hz) may be 50 Hz. The MEMS actuator may have a settling time for 100 micron motion of 15 ms and a settling overshoot after 100 microns of 5%.

Figure 12:
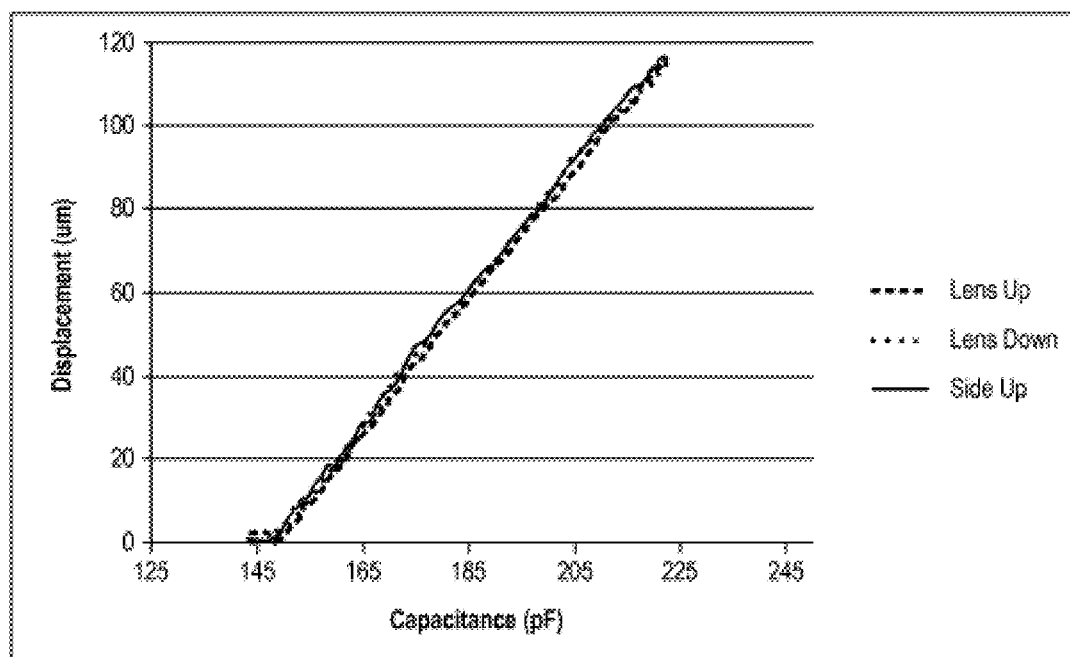
FIG. 12 shows plots of MEMS displacement versus capacitance in accordance with lens up, lens down and side example embodiments described at U.S. Ser. No. 61/698,567, which is incorporated by reference, with particular reference to FIGS. 24-32 therein.

The capacitance of a MEMS focus actuator as a function of displacement may be as illustrated in the plots of FIG. 12. A capacitance measurement block may be included in the driver, which measures an equivalent capacitance of the MEMS focus actuator in picoFarads. Measured capacitance values may be stored in a readable internal I2C accessible register. The bit depth of a capacitance value may be 10 bits or more, with a resolution less than 0.3 pF/bit. A capacitance measurement time may be less than 50 microseconds.

FIG. 12 shows plots of MEMS displacement versus capacitance in accordance with lens up, lens down and side example embodiments described at U.S. Ser. No. 61/698,567, which is incorporated by reference, with particular reference to FIGS. 24-32 therein. The three camera orientations of lens up, lens down and side are examples illustrated in the '567 application for a camera module or camera enabled device aimed at angles above and below the horizon, and horizontally, respectively.

Boot ROM

In certain embodiments, an 8051 CPU (see FIG. 10, element 1006, e.g.) uses a boot ROM to execute from a power on reset. The boot ROM for a driver IC in certain embodiments may be 4 Kbytes in length. A boot ROM code may be fused in production of the driver IC. The Boot ROM functions may include in certain embodiments the following:

Initializing the 8051 HW registers in the CPU;
Initializing the internal memory of the CPU;
Initializing a Stack Pointer;
Initializing the External registers outside the CPU that are contained in the driver IC;
Starting the initial Idle loop of the CPU; and
Marking the I2C register as device ready for command and control communication by setting the CPU_READY bit in the control register of the I2C interface.

In certain embodiments, Default ROM operations may include the following:

Initializing the CPU system;
Going to Idle loop, wherein an example IDLE loop Process may include the following:
Waiting for I2C command;
Processing I2C Command;
Decoding Command; and
Waiting for Timer tick (1 ms).

In certain embodiments, any or all of the following commands are supported:

Download Microcode, check header, checksum, start code if download is OK;
Enable/Disable V_AF;
RAMP DAC Test;
Start Control Loop (ROM Version);
Return Code Checksum;
Test RAM int;
Test Program RAM;
Test Data RAM;
Checksum ROM;
Report Capacitance;
Calibrate DAC;
Set Loop coefficients, A, B, C, D, Kp, Sample;
Report Camera Angle;
Report Acceleration/Velocity from Cap Measurement Observer; and
Set V_AF Ramp Profiler.

Run Time Control Loop

The run time closed loop control in accordance with certain embodiments includes a "State Space" control system. The System may run on a 1 ms timer interrupt. The 1 ms timer interrupt may be optionally not used during the stepping/ramp processing for the starting and ending of the V_AF reposition time, ringing calibration, camera angle slope measurements, dead band measurements, and state variable coefficient calibration.

There are two sets of Host to CPU and CPU to host register sets in certain embodiments. These registers may be used to debug and optimize the control loop system with a DSP based I2C host controller. There are also two RS232 mimic registers for transmit and receive during normal testing operations that control the 8051 environment during testing.

Figure 13:
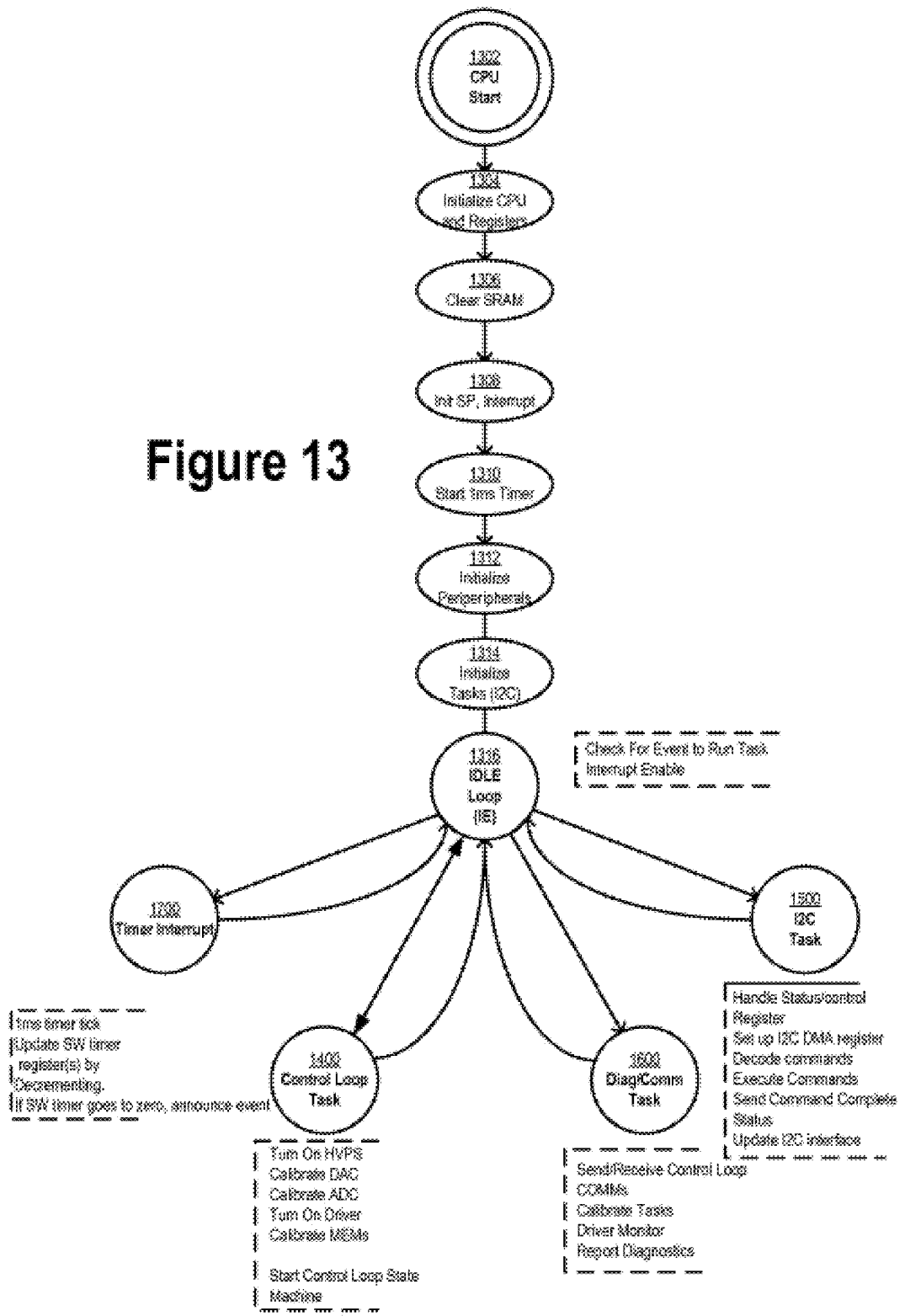
FIG. 13 illustrates a method of driving a MEMS actuator in accordance with certain embodiments.

The CPU/Host registers are configured to pass commands and status during normal operation, calibration and production testing. Once the CPU is running from RAM, or the embedded ROM version of the control loop, the host commands that are supported via I2C registers may include the ROM code commands listed above, as well as any or all of the following:

Reset the Processor from ROM, Re-initializing;
Seek to location 0 to 65535;
Close loop operation;
Open loop operation, linear;
Logarithmic open loop seek operation;
Set ramp filter coefficients;
Set Capacitance Qualification parameters (Averaging, gain, Partial Response qualifier);
Report MEMS defect zones;
Report calibrated coefficients;
BODE mode, set loop input/output position; and
Calibrate Actuator;

FIG. 13 illustrates a method of driving a MEMS actuator in accordance with certain embodiments. A MEMS (micro-electro-mechanical system) driver may utilize 8051 CPU firmware or other suitable software-, firmware- and/or hardware-based processing technology. An example of a firmware flow chart is provided at FIG. 13. At a CPU start 1302, a CPU and registers are initialized at 1304. SRAM and/or flash, EEPROM, DRAM or combinations thereof or other static and/or dynamic ready access memory is cleared at 1306. A signal processor (SP) is initialized at 1308. An interrupt may be used to transfer control from a current procedure to a new operation. A 1 ms timer may be started at 1310. Peripherals may be initialized at 1312. I2C tasks may be initialized at 1314. An IDLE loop is provided at 1316. In case of an event, a run task interrupt may be enabled. In the example of FIG. 13, there are four processes that may occur directly from the IDLE loop 1316, including Control Loop Task (1400, see FIG. 14), the I2C task (1500, see FIG. 15), a Diag/Comm task (1600, see FIG. 16), and a Timer Interrupt (1700, see FIG. 17).

The control loop task 1400 may include in certain embodiments the following example operation:
Turn on HVPS;
Calibrate DAC;
Calibrate ADC;
Turn on Driver;
Calibrate MEMS; and
Start control loop state machine.

The I2C task 1500 may include in certain embodiments the following example operations:
Handle status/control register;
Set up I2C DMA register;
Decode commands;
Execute commands;
Send command complete status; and
Update I2C interface.

The Diag/Comm task 1600 may include in certain embodiments the following example operations:
Send/receive control;
Loop COMMs;
Calibrate tasks;
Driver monitor; and
Report diagnostics.

The timer interrupt task 1700 may include in certain embodiments the following example operations:
1 ms timer tick;
Update SW timer register(s) by decrementing; and
If WE timer goes to zero, event is announced.

Figure 14:
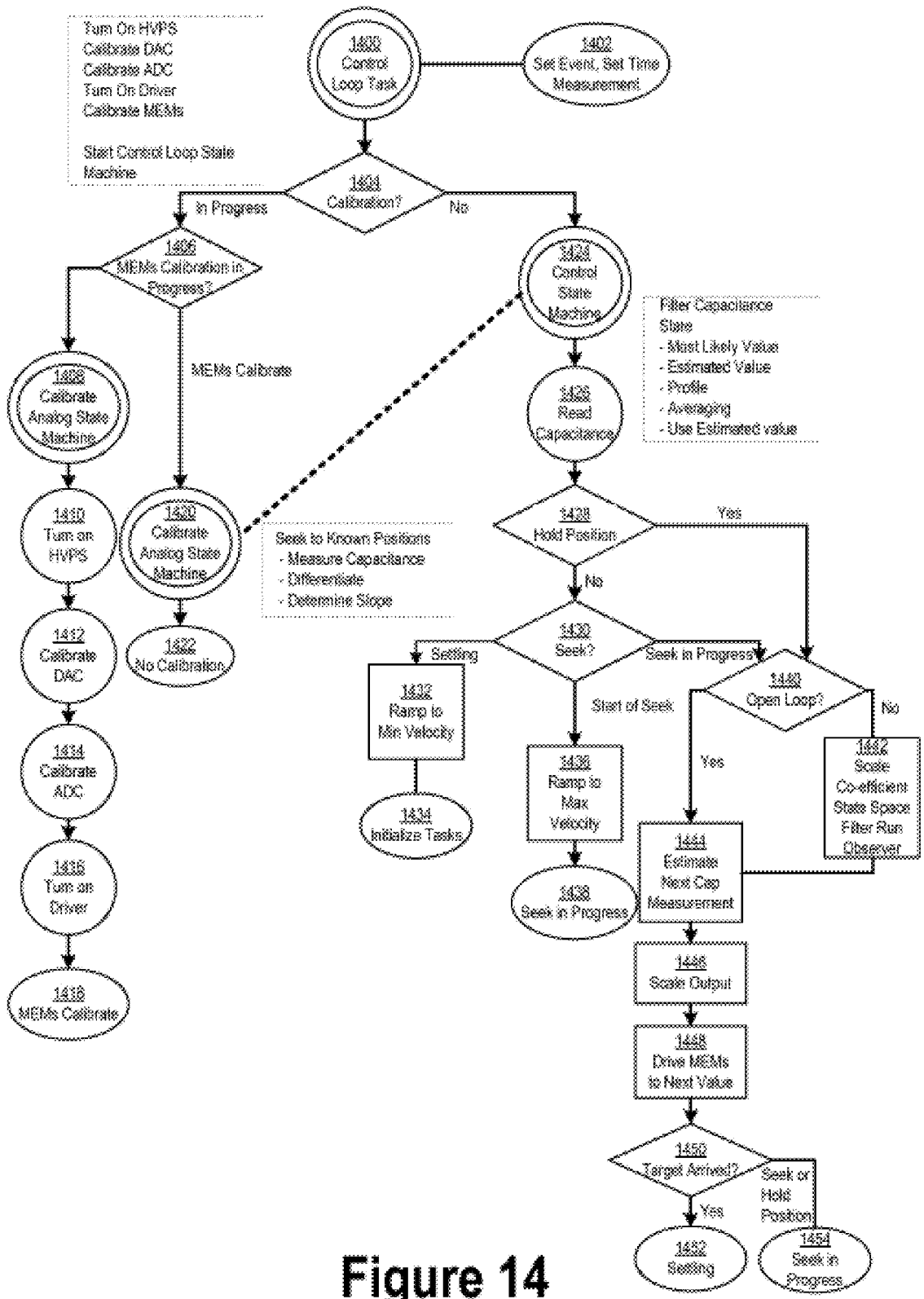
FIG. 14 illustrates a control loop task for a method of driving a MEMS actuator in accordance with certain embodiments.

FIG. 14 illustrates a control loop task 1400 for a method of driving a MEMS actuator in accordance with certain embodiments. The control loop task 1400 may include in certain embodiments the following example operations: Turn on HVPS; Calibrate DAC; Calibrate ADC; Turn on Driver; Calibrate MEMS; and Start control loop state machine. At 1402, an Event and Time may be set, and a Measurement may be initiated, triggered and/or scheduled. At 1404, calibration is determined. If calibration is determined to be in progress at 1406, then at 1408 the analog state machine is calibrated. HVPS is turned on at 1410, DAC and ADC are calibrated, respectively, at 1412 and 1414. The MEMS driver is turned on at 1416. A MEMS calibration is performed at 1418. For MEMS calibration, at 1420, a MEMS state machine may be calibrated, wherein an example calibration process may involve seeking to move the one or more movable lenses of the auto-focus camera module using MEMS actuation to one or more known positions, measuring capacitance, and differentiating to determine a slope. A no calibration block is provided at 1422.

At 1424, control is provided to the MEMS state machine. A capacitance is read at 1426. The capacitance reading at 1426 can include filtering a capacitance state for one or more of: a most likely value, an estimated value, a profile, averaging, and using an estimated value. It may be determined not to hold the position at 1428, in which case a ramp to a minimum velocity may be set at 1432, and the position may be held at 1434. At a start of seeking, a ramp to maximum velocity may be set at 1436, and a seek process is then put into progress at 1438. Whether it was determined to hold position at 1428 or if a determination that a seek process is in progress at 1430, then an open loop determination is made at 1440. If no open loop is determined, then at 1442, coefficients are scaled, state space is filtered and observer is run. If open loop is determined at 1440, or if not, then after 1442, a next capacitance measurement is estimated at 1444. Output is scaled at 1446. The MEMS component is driven to a next value at 1448. If at 1450 it is determined that the MEMS component has arrived at a target, e.g., a focus condition has been reached for MEMS actuated auto-focus camera module, then a setting is determined at 1452. If not, then it may be determined to hold the position, or to continue to seek at 1454.

Figure 15:
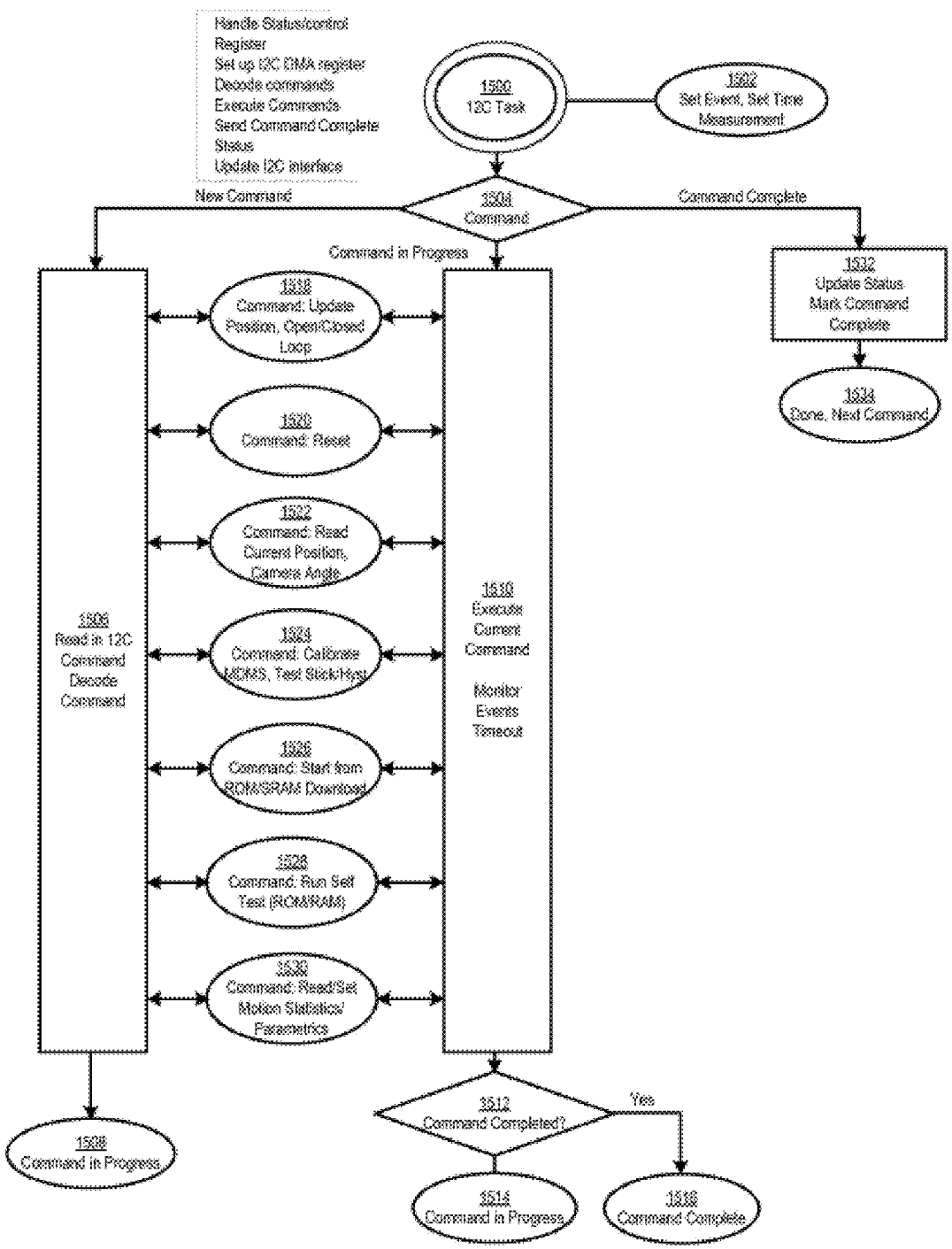
FIG. 15 illustrates an I2C task for a method of driving a MEMS actuator in accordance with certain embodiments.

FIG. 15 illustrates an I2C task for a method of driving a MEMS actuator in accordance with certain embodiments. The I2C task 1500 may include in certain embodiments the following example operations:
Handle status/control register;
Set up I2C DMA register;
Decode commands;
Execute commands;
Send command complete status; and
Update I2C interface.

At 1502, event and time may be set and a measurement may be triggered, initiated, or scheduled. At 1504, it is determined whether there is a new command by reading in at 1506 an I2C command decode command, after which a command may be in progress at 1508. A command in progress may be determined at 1504, whereby a current command may be executed and event monitoring and timeout may be performed at 1510. At 1512, it may be determined whether a command is completed, and if not, then a command may be in progress at 1514 or a command may be complete at 1516. The read in I2C command and execute current command components 1506 and 1510, respectively, may be in certain embodiments subject to the following commands: at 1518, update position, open/close loop,
reset at 1520,
read current position and camera angle at 1522,
calibrate MEMS,
test and stick/hysteresis at 1524,
start from ROM/SRAM download at 1526,
run self test ROM/RAM at 1528, and
read/set motion statistics and parametrics at 1530.

When command is complete, then status is updated by marking command completed at 1532. That command being completed and the status updated, a next command can be moved to at 1534.

Figure 16:
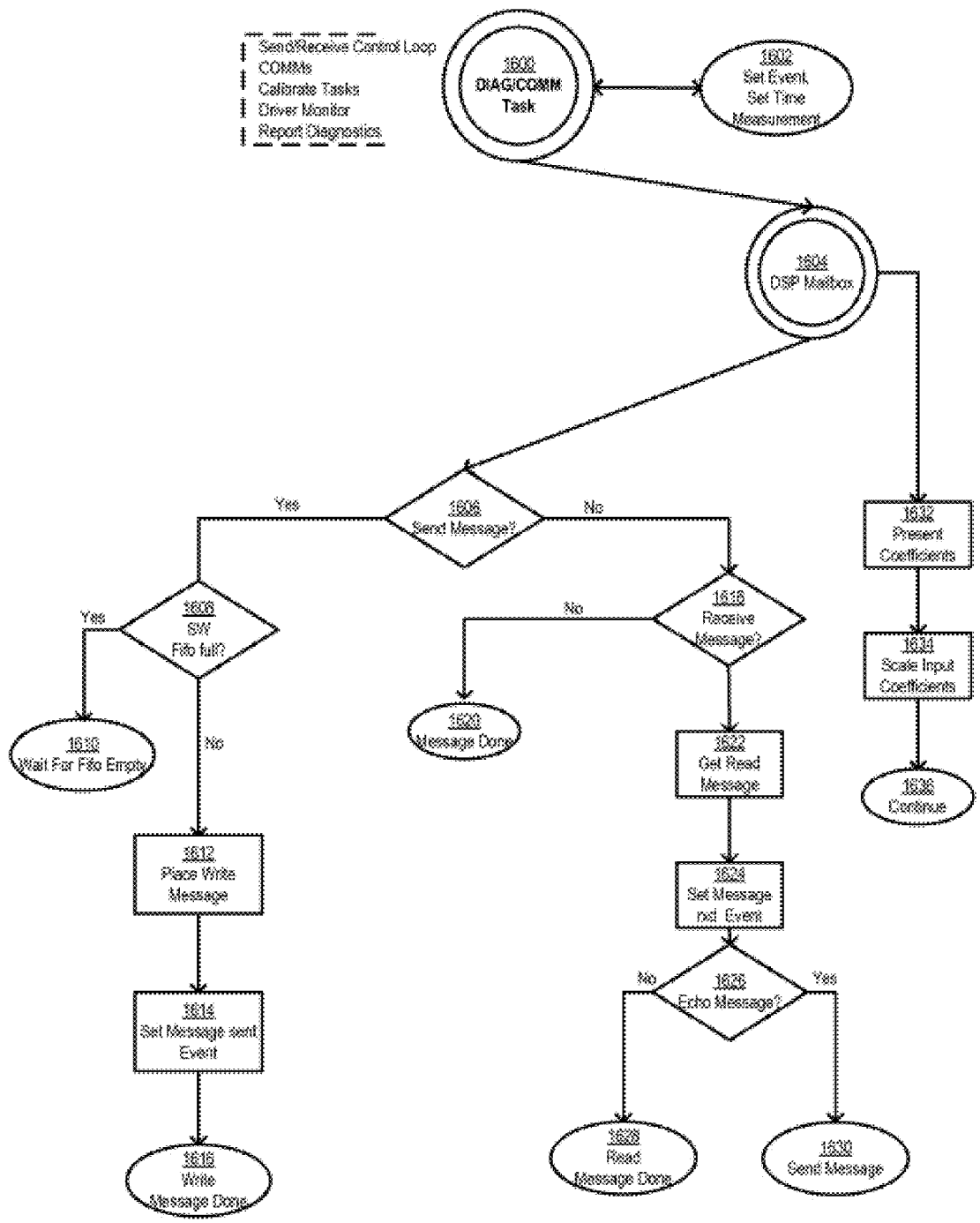
FIG. 16 illustrates a Diag/Comm task for a method of driving a MEMS actuator in accordance with certain embodiments.

FIG. 16 illustrates a Diag/Comm task for a method of driving a MEMS actuator in accordance with certain embodiments. The Diag/Comm task 1600 may include in certain embodiments the following example operations/commands:

Send/receive control;
Loop COMMs;
Calibrate tasks;
Driver monitor; and
Report diagnostics.

At 1602, event and time may be set and a measurement may be triggered, initiated, or scheduled. From a DSP mailbox 1604, it may be determined to send a message at 1606, and at 1608 if FIFO is full, then a wait for FIFO empty occurs at 1610. When the FIFO is not full at 1608, then a write message is placed at 1612. A set message sent event is performed at 1614 and a write message done occurs at 1616. It may be determined not to send a message at 1606, and it may be determined whether to receive a message at 1618, and if not then message is done at 1620. If it is determined to receive a message, then a get read message occurs at 1622. At 1624, a set message rxd event is followed by a determination as to an echo message, and if not, the read message is done at 1628, and if so, then a message is sent at 1630. From the DSP mailbox, present coefficients may be determined at 1632 and scaling input coefficients occurs at 1634, when the process is continued at 1636

Figure 17:
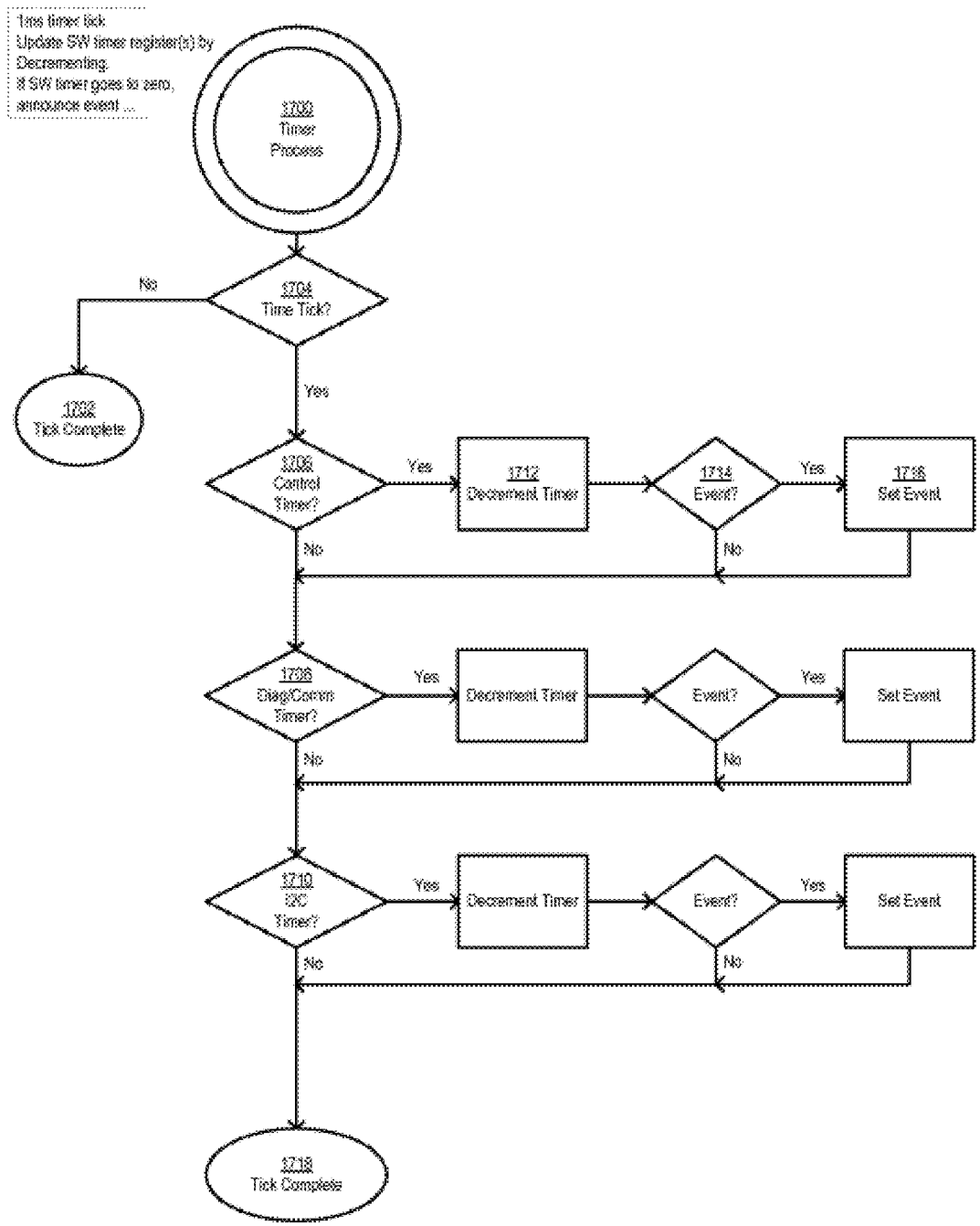
FIG. 17 illustrates a timer process for a method of driving a MEMS actuator in accordance with certain embodiments.

FIG. 17 illustrates a timer process for a method of driving a MEMS actuator in accordance with certain embodiments. The timer interrupt task 1700 may include in certain embodiments the following example operations/commands:

1 ms timer tick (or other preset, selected and/or dynamic interval/duration);
Update SW timer register(s) by decrementing; and
If SW timer goes to zero, event is announced.

If a time tick is determined to be no at 1704, then tick complete occurs at 1702. If time tick is determined to be yes, then a control timer is determined at 1706. If yes, then a decrement timer occurs at 1712, and if an event is determined at 1714, the event is set at 1716. After the event is set or if no event is determined or if control timer is determined to be no, then a diagnostic COMM timer is determined at 1708, when if yes, decrement timer 1712, event 1714 and set event 1716 are run, and if no at 1708 or event no at 1714 or event is set at 1716, then I2C timer is determined. If yes, then a decrement timer occurs at 1712, and if an event is determined at 1714, the event is set at 1716. If I2C timer is determined to be no, or no event is determined 1714, or if the event is set at 1716, then tick is complete at 1718.

Figure 18:
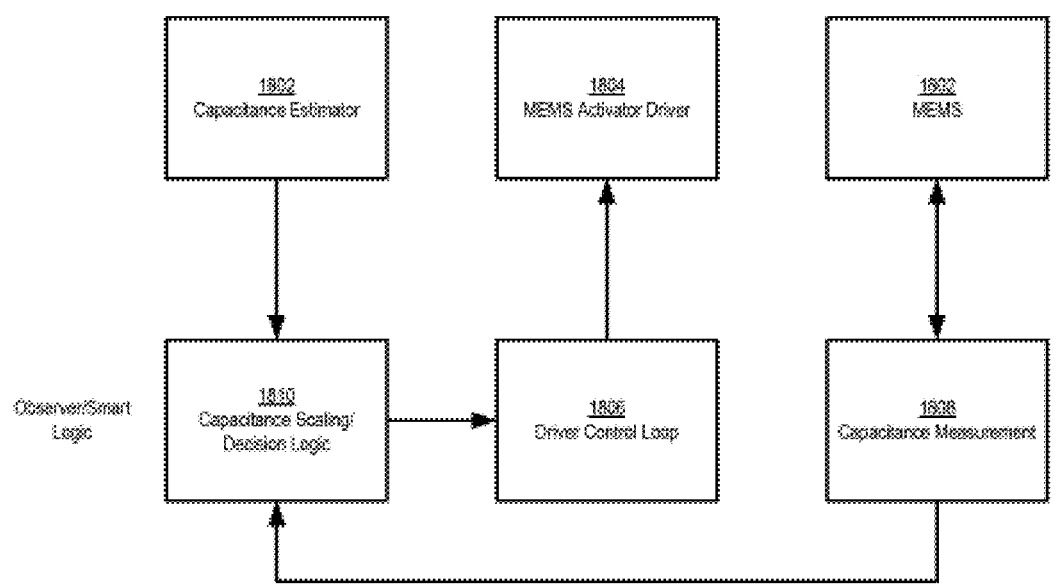
FIG. 18 schematically illustrates in block format certain components of a MEMS actuator driver, particularly for an auto-focus camera module in accordance with certain embodiments.

FIG. 18 schematically illustrates a block description of a MEMS actuator, particularly for an auto-focus camera module, in accordance with certain embodiments. The MEMS actuator blocks illustrated at FIG. 18 include a capacitance estimator 1802, a MEMS actuator driver 1804, a driver control loop 1806, a capacitance measurement component 1808, a capacitance scaling and decision logic component 1810, and the MEMS component 1812.

The capacitance estimator 1802 may observe the mechanical motion and position of the MEMS component 1812. The capacitance estimator 1802 may calculate dynamic mechanical equations that estimate MEMS behavior. A predetermined driver pattern is built dynamically in certain embodiments during motion. The capacitance estimator pre-calculates in these embodiments the motion of the MEMS device.

The capacitance estimator 1802 may build a driver table in certain embodiments that estimates the desired motion of the MEMS in upcoming driving events. The driver table built by the capacitance estimator may be used to drive the MEMS by itself for short sequences and/or extended seek routines or may be utilized in combination with actual capacitance input data. The capacitance estimator 1802 may be used to provide calculated capacitances, e.g., when no actual capacitance measurement is received or obtained and/or when an error has occurred in the actual capacitance measurement. Errors in capacitance measurements may be apparent when an undesirable or unexpected out of focus condition has been determined. The driver table may be used in certain embodiments to drive the MEMS in an open loop control system mode when there is not enough gain or phase margin to control the MEMS during positioning. The capacitance estimator 1802 may generate an estimator table that may be used to observe real capacitance-position information so that decision logic block 1810 (e.g., see below description of example embodiments) can decide either to use an estimated or real capacitance measurement. In other embodiments, the capacitance estimator 1802 may be used to calibrate an actual capacitance measurement component and/or may be used in a diagnostic capacity.

A capacitance scaling and/or decision logic component 1810, which may also be referred to as an observer 1810 and/or smart logic 1810 in certain embodiments, may be configured to multiply, divide, add and/or subtract real values, and/or perform more complex calculations, in accordance with control loop feedback input so that the control loop may be stabilized within a predetermined and/or dynamically determined range. The capacitance may be rectified in certain embodiments. The capacitance may be limited to a real value in certain embodiments so as not to overflow control loop calculations.

A capacitance scaling and/or decision logic component 1810 may be configured in certain embodiments to make one or more decisions, such as whether too many over-limit capacitance measurements or error measurements or capacitance not available measurements have been made. The component 1810 may also be configured to determine whether to use an estimated capacitance, e.g., as may be provided by the capacitance estimator 1802. The component

1810 may include decision logic that determines whether a particular process involves a calibration process and/or whether to allow one or more or all capacitance measurements to be used to build estimator equation coefficients and/or run time control loop coefficients.

A capacitance measurement component 1808 may be configured to measures an effective displacement of a MEMS component 1812 by performing, undertaking, controlling or monitoring a capacitance measurement and/or receiving information based on such capacitance measurement. The capacitance measurement component 1808 may be configured to use a continuous frequency method to measure an observed phase of an analog waveform.

The capacitance measurement component 1808 may compare the phase to an internal reference capacitor. Information from this comparison may be used to calculate increased capacitance effects on a MEMS actuator driver 1804 (e.g., see below description of example embodiments). The phase comparison may result in certain embodiments in a direct measurement of a MEMS displacement movement as the MEMS 1812 is driven to new positions by external forces and/or by a voltage driver such as MEMS actuator driver 1804.

The capacitance may be averaged in certain embodiments over multiple samples (e.g., 5, 10, 25, 50, 100 or more). The average may be compared to the sampled values. In one example embodiment, the capacitance measurement component is configured such that if the variance is greater than a calibrated voltage, and there are less than 2 error samples, the out of range samples are removed, and the remainder samples are re-averaged. Variations of the number of sample, the number of error samples and threshold variance are provided in further embodiments. When the capacitance measurement block determines that there are too many samples, then the decision logic 1810 may be configured to determine an "estimated" capacitance value to be used for the control loop.

A driver control loop 1806 is configured in certain embodiments as a mathematical block that may be used to accept feedback from the capacitance measurement component 1808 and/or estimated feedback, e.g., from the capacitance estimator 1802, and drive the MEMS voltage driver 1804. Mathematical control loop equations may be used by the driver control loop 1806 to filter input data. The driver control loop is configured in certain embodiments to drive the MEMS 1812 in a fast, yet stable, motion. The driver control loop is also configured in certain embodiments to prevent the MEMS 1812 from operating in an unstable manor.

The mathematical control loop equations may be calibrated by the following example process: (i) scale a zoning operation of the MEMS 1812, (ii) find min/max drive values, and (iii) set gain and offset calculations. A separate calibration technique may be used to scale the control loop coefficients. The min/max drive values may be calculated in certain embodiments by incrementally driving the MEMS between the MIN/MAX positions and observing relatively low changes in capacitance measurements, thereby setting min/max driver values. This process may be used to take care of driver drift and/or voltage over temperature variations.

Position coefficients may be calibrated in certain embodiments in multiple zones. For example, N zones may be used to estimate the position of the MEMS 1812. The min/max drive values may be used, and then divided by the number of zones to come up with a position and slope table. The MEMS 1812 may be positioned relative to each zone, e.g., in the middle and/or at the boundaries, and the estimator table may then be built by reading each capacitance at each zone step. The slope may be calculated from the difference of each zone step. This table may then be used to calculate the new position as a percentage of motion.

Velocity motion coefficients may be calibrated in certain embodiments by measuring a ringing of the MEMS, e.g., in ½ max position seeks and ¾ position seeks. The ringing may be measured by the capacitance measurement component 1808. The ringing may be reduced by control using one or more ramp/seek profile tables to reduce settling time to a minimum while maximizing velocity seek performance of the MEMS 1812.

The MEMS activator driver 1804 is configured in certain embodiments to scale incoming low voltages to high voltages for driving the MEMS 1812. A control processor of the MEMS activator driver 1804 may be configured to command the driver voltage through a range, e.g., an auto-focus range of a movable lens or movable lens group, from a minimum MEMS position to a maximum MEMS position. The control processor of the MEMS activator driver may be configured in certain embodiments to modulate the voltage with a small signal sine wave for measuring a phase response due to a capacitance load on the MEMS. Example driver conditions may be set as: (i) Off, (ii) On DC only, and (iii) ON with modulation and DC offset. The MEMS activator driver 1804 may be short circuit protected in the event of MEMS failure and/or shorting of MEMS driver voltage pins.

Figure 19:
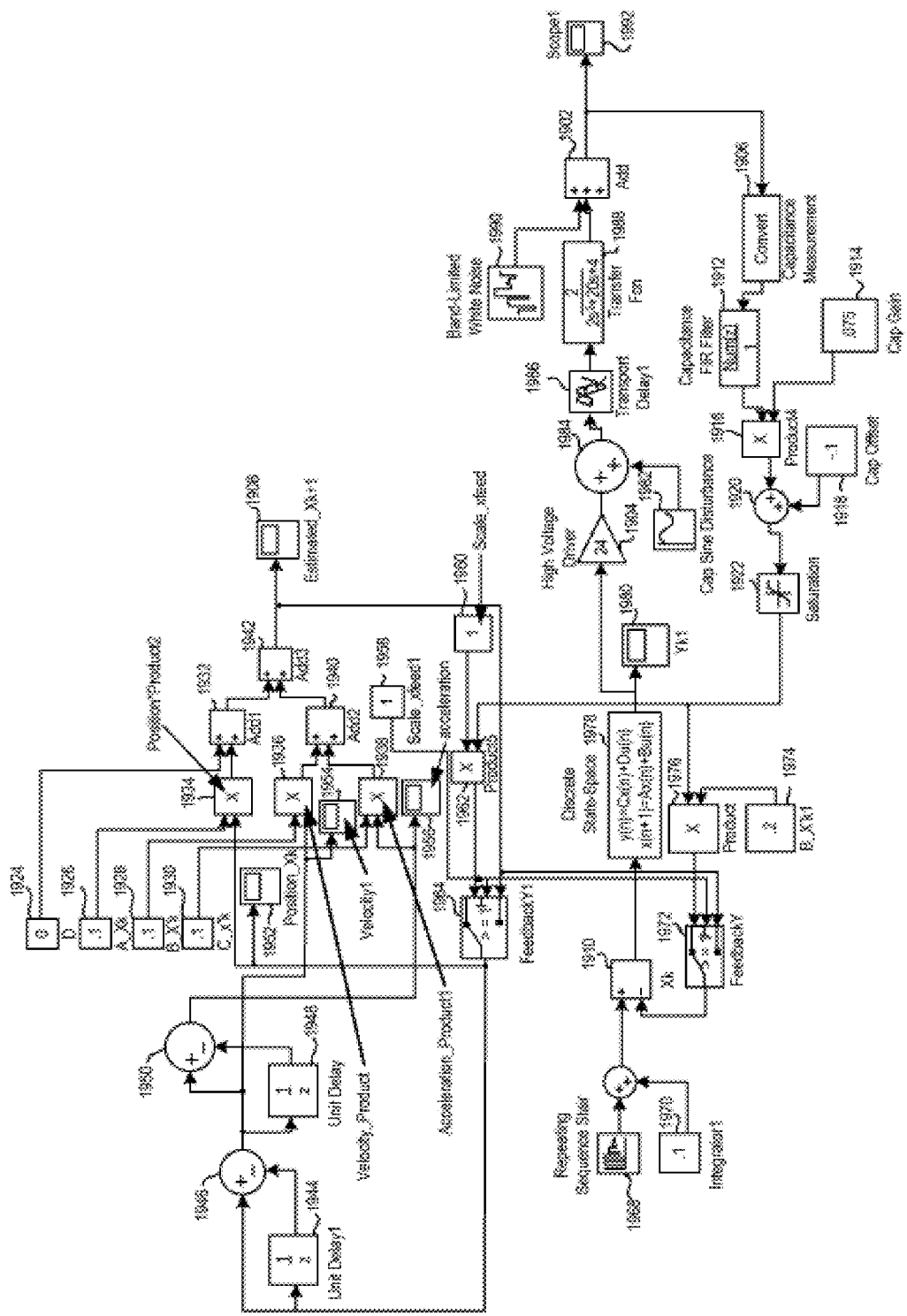
FIG. 19 schematically illustrates an example of a MEMS actuator driver, particularly for an auto-focus camera module, in accordance with certain embodiments.
Figure 20A:
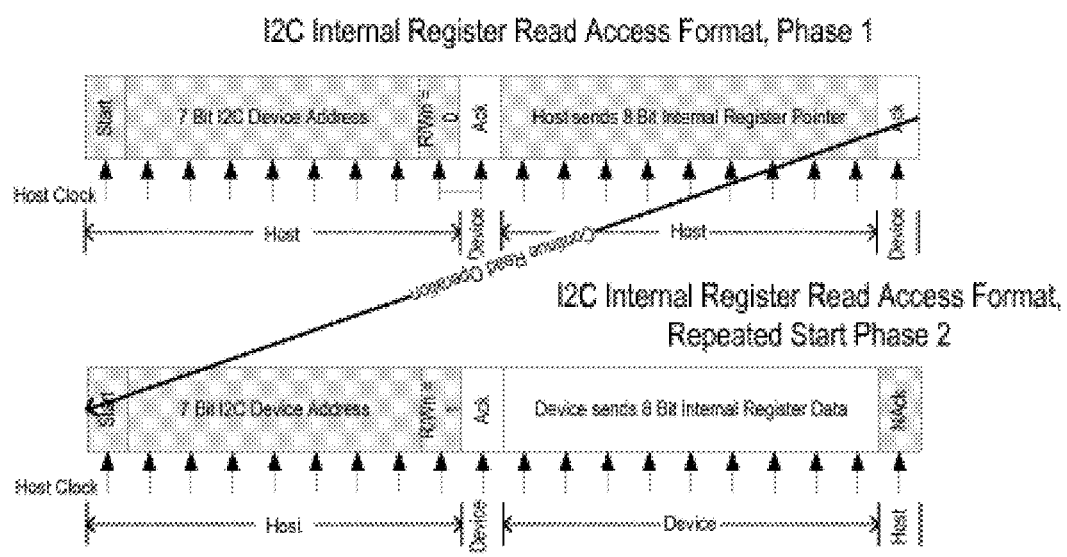
FIG. 20A schematically illustrates an I2C controller data host access read format in accordance with certain embodiments.
Figure 20B:
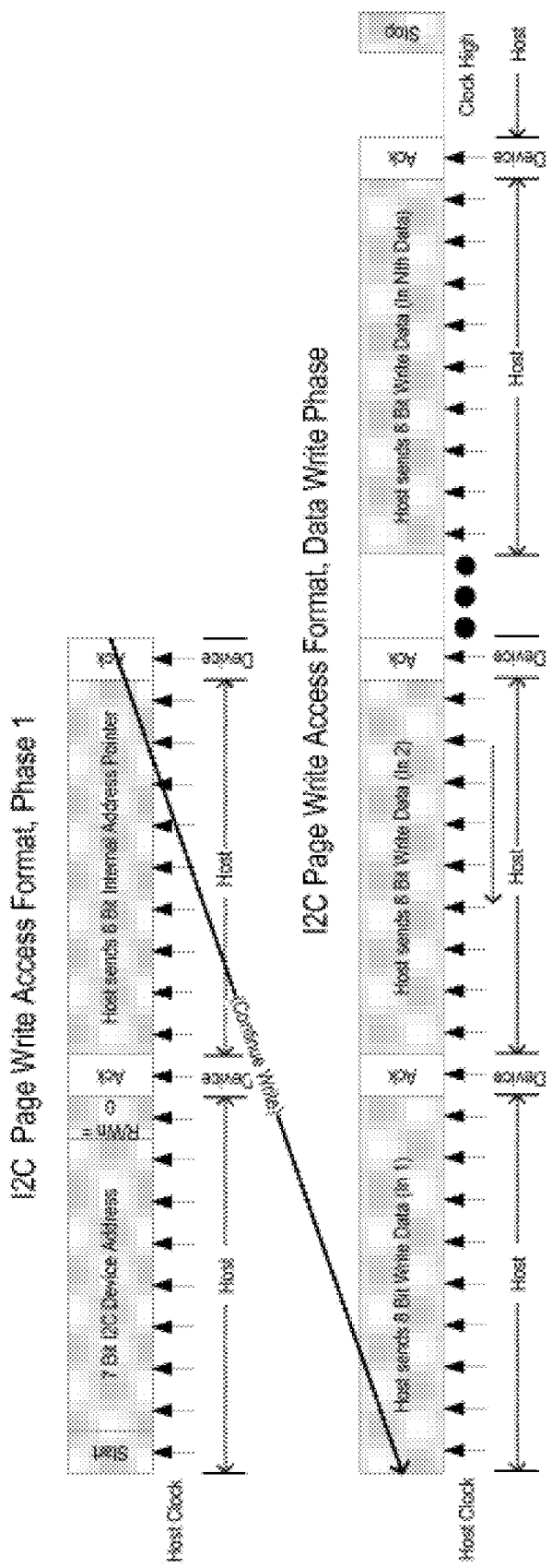
FIG. 20B schematically illustrates an I2C controller data host access write format in accordance with certain embodiments.

FIG. 19 schematically illustrates an example of a MEMS actuator driver, particularly for an auto-focus camera module in accordance with certain embodiments. Noise generator components 1902 and 1990 are configured in the example embodiment illustrated schematically at FIG. 19 to generate noise, e.g., band-limited, white noise. The noise generator component 1990 provides an input to component 1902 which also receives input from a MEMS model component 1988. The noise generator component 1902 provides output to a capacitance measurement component 1906 and to a MEMS position response monitor 1992.

The noise generator components 1902 and 1990 provide noise stimulus for modeling purposes. The noise generator components 1902 and 1990 are configured in certain embodiments to simulate white noise such as that created by a camera-enabled cell phone or other embedded device environment during a closed loop operation. The stimulus may be used in certain embodiments to check capacitance sampling error processing, tune filters and/or check loop stability in a cell phone or other camera-enabled embedded device environment.

A high voltage driver 1904 is shown in FIG. 19 receiving input from a state space component 1978 or control loop component 1978. The high voltage driver 1904 provides output that is received at a MEMS disturbance node 1984. The high voltage driver 1904 is configured in certain embodiments to convert low voltage internal to a driver IC to high voltage. The high voltage driver 1904 may include a charge pump and voltage driver. The high voltage driver 1904 may include a Digital to Analog converter (DAC). The high voltage driver 1904 may be controlled internally within the camera module, while certain inputs may be received from one or more camera-module enabled embedded device components. For example, the camera module may have a dedicated processor and/or processor-readable program code and/or one or more data storage memory components. A processor of a camera phone or other camera-module enabled embedded device within which the camera module is installed and/or with which the camera module is configured to receive commands and/or communicate image data. Program code and/or other diagnostic data may be stored with the camera module, the embedded device, and/or externally, e.g., on the "cloud" and utilized in the certain operational blocks, components or modes of the camera module. The high voltage driver 1904 may receive input voltage in a range between 1V DC to 4V DC, while providing output as an output driver between 0V DC to 35V DC.

A capacitance measurement component 1906 receives input from component 1902, which may be configured to add a MEMS model input from component 1988 and a noise input from component 1990. Capacitance measurement component provides output that is received at capacitance filter 1912. The capacitance measurement component 1906 in certain embodiments converts capacitance to a digital value. The capacitance measurement component may convert, e.g., any of a range of capacitances from 0 pf to 1000 pf to digital values of, e.g., 16 bits. Component 1906 measures capacitance of a MEMS device using a digital processor.

The capacitance measurement component 1906 is configured to perform a digital processing method that uses a signal driver voltage and compares an internal reference capacitor phase with a driven MEMS capacitance phase. A result of the process is a value representing a difference between an internal capacitance and an external capacitance. A 16 bit digital capacitance is used in certain embodiments for feedback for the closed loop controller. A MEMS capacitance value is provided that represents a distance traveled of a MEMS actuated device such as a movable lens or movable lens group of an auto-focus camera module of an embedded device.

FIG. 19 also illustrates an estimator monitor component 1908. In certain embodiments, the estimator monitor component is configured for debug processing. The estimator monitor component 1908 may be configured to observe a process wherein a MEMS driver (e.g., component 1804 of FIG. 18) utilizes estimated capacitances in combination with measured capacitances to provide more accurate, precise, complete and/or stable input commands to a MEMS component (e.g., component 1812 of FIG. 18), wherein the MEMS component may be coupled with a movable lens or movable lens group or movable image sensor relative to one or more lenses or mirrors and/or other components of an auto-focus camera module such that a reliable and stable focus condition is constantly achieved rapidly and efficiently for sequences of many images involving different focus conditions.

An error calculator component 1910 is also illustrated schematically at FIG. 19. The error calculator component 1910 receives in certain embodiments inputs from a decision switch 1972, that receives input from components 1942, 1958 and 1976, and a node 1969, that receives input from components 1968 and 1970, whereby examples of each of these components are described in more detail below. The example error calculator component 1910 illustrated schematically at FIG. 19 is configured in accordance with certain embodiments to subtract a target location from an actual MEMS location and to create an error location for a closed loop control calculator 1978.

A capacitance noise filtering component 1912 is illustrated schematically in FIG. 19 as receiving input from capacitance measurement component 1906 and providing output to capacitance gain component 1916. The capacitance noise filtering component 1912 is configured in certain embodiments to use a finite impulse response filter to eliminate high frequency noise caused by cell phone or other embedded device electrical noise stimulus.

Capacitance gain components 1914 and 1916 include gain component 1914 and multiplier component 1916 that outputs to capacitance offset node 220 a gain multiplied product of the output from the capacitance noise filtering component 1912 and gain component 1914. Capacitance gain components 1914 and 1916 are used in certain embodiments to increase signal gain as a function of maximum and minimum calibrated capacitance values for matching internal control models to a known range.

Capacitance offset components 1918 and 1920 are configured such that output from component 1918 and output from component 1916 are received as inputs to component 1920 which outputs an offset capacitance value to capacitance value limiter component 1922. The capacitance offset components 1918 and 1920 are configured in certain embodiments to add or subtract a zero reference offset respectively to or from a capacitance value received from component 1916 in order to create a balanced calibration value, e.g., to a midpoint calibrated capacitance value. The capacitance offset components 1918 and 1920 may be configured to remove an offset error for a measured capacitance value so that internal calculations may utilize a balanced reference point without arbitrary offsets.

FIG. 19 also schematically illustrates a capacitance measurement limiter 1922 that is configured in certain embodiments to receive input from capacitance offset node 1920 and to provide output that is received at component 1962. Capacitance measurement limiter 1922 is configured in certain embodiments to limits a capacitance measurement to a minimum or maximum value or both. Capacitance measurement limiter 1922 may be configured to eliminate calculation over-limits in a control loop. Capacitance measurement limiter 1922 may be configured to eliminate out of the ordinary, out of bounds calculations to keep the control loop in a stable, correctly signed value range.

Output from component 1924 is provided to component 1932 within in an estimator block of a MEMS actuator driver illustrated schematically in FIG. 19 in accordance with certain embodiments. Component 1924 may be configured to output an offset test pattern to the component 1932 with the estimator block. The offset test pattern may be added into an estimator calculator in certain embodiments. The offset test pattern output by the component 1924 may be used for calibration and/or to debug the estimator calculator.

Output from component 1926 is provided to component 1934 within an estimator block of a MEMS actuator driver illustrated schematically in FIG. 19 in accordance with certain embodiments. The component 1934 also receives input from component 1964. The component 1934 provides output that is received at component 1932 along with output from component 1924. Component 1926 may be configured to output an estimated MEMS position calculation to the component 1934. The component 1926 may include an estimated position calculator. In one example, the form may involve a position value $X_k$ and a position scalar A. An example result may involve a position value $X_{k+1} = A \cdot X_k$, where $X_{k+1}$ represents the $(k+1)^{th}$ position value of a next predicted location after the location associated with the $k^{th}$ position value.

Output from component 1928 is provided to component 1936 within an estimator block of a MEMS actuator driver illustrated schematically in FIG. 19 in accordance with certain embodiments. The component 1936 also receives input from component 1946. The component 1936 provides output that is received at component 1940 along with output from component 1938. Component 1928 may be configured to output an estimated MEMS velocity calculation to component 1936. The component 1928 may include an estimated velocity calculator. In one example, the form may involve a velocity value $X'_k$ and a velocity scalar B. An example result may involve a velocity value $X'_{k+1}=B*X'_k$, where $X'_{k+1}$ represents the $(k+1)^{th}$ velocity value of a next predicted velocity after the velocity associated with the $k^{th}$ velocity value.

Output from component 1930 is provided to component 1938 within an estimator block of a MEMS actuator driver illustrated schematically in FIG. 19 in accordance with certain embodiments. The component 1938 also receives input from component 1950. The component 1938 provides output that is received at component 1940 along with the output from component 1936. Component 1930 may be configured to output an estimated MEMS Acceleration calculation to component 1938. The component 1930 may include an estimated acceleration calculator. In one example, the form may involve an acceleration value $X''_k$ and an acceleration scalar C. An example result may involve an acceleration value $X''_{k+1}=C*X''_k$, where $X''_{k+1}$ represents the $(k+1)^{th}$ acceleration value of a next predicted acceleration after the acceleration value associated with the $k^{th}$ acceleration value.

Component 1932 of an estimator block of a MEMS actuator driver illustrated schematically in FIG. 19 in accordance with certain embodiments includes a summing junction for a position calculation. Component 1932 receives input from components 1924 and 1934 and provides output to be received at component 1942.

Component 1934 of an estimator block of a MEMS actuator driver illustrated schematically in FIG. 19 in accordance with certain embodiments includes a product multiplier for a position calculation. Component 1934 receives input from components 264 and 226 and provides output to be received at component 1932.

Component 1936 of an estimator block of a MEMS actuator driver illustrated schematically in FIG. 19 in accordance with certain embodiments includes a product multiplier for a velocity calculation. Component 1936 receives input from components 1928 and 1946.

Component 1938 of an estimator block of a MEMS actuator driver illustrated schematically in FIG. 19 in accordance with certain embodiments includes a product multiplier for an acceleration calculation. Component 1938 receives input from components 1930 and 1950.

Component 1940 of an estimator block of a MEMS actuator driver illustrated schematically in FIG. 19 in accordance with certain embodiments includes a summing junction for velocity and acceleration calculation terms. Component 1940 receives input from components 1936 and 1938 and provides output to be received at component 1942.

The position, velocity and/or acceleration may be determined, calculated, measured and/or monitored in one, two or three linear dimensions, and one or more rotational dimensions may be included. Any one or more of the vector quantities of linear position, velocity and acceleration, and optionally one or more rotational dimensions, of a MEMS component of an auto-focus camera module or other MEMS actuated component, may be determined, calculated, measured and/or monitored in certain embodiments, and/or one or more linear and/or rotational position and/or movement vectors of a camera module and/or an embedded device that includes a camera module may be determined, calculated, measured and/or monitored, in addition or alternative to determining, calculating, measuring and/or monitoring the particular position, velocity and acceleration of the MEMS component relative to the camera module and/or embedded device. In this regard, US patent applications 61/698,567, 61/675,812 and 61/622,480 and U.S. Pat. Nos. 7,317,815, 7,403,643, 7,640,803, 8,036,460, 8,054,564, 8,081,844, 8,169,486, 8,212,882, 8,265,348, 8,265,399, 8,285,001, and 8,358,841, and US published patent applications 2012/0062761, 2012/0075504, 2012/0106790, 2012/0133746, 2012/0155709, 2012/0207358, 2012/0219180, and 2013/0023072 are hereby incorporated by reference.

Component 1942 of an estimator block of a MEMS actuator driver illustrated schematically in FIG. 19 in accordance with certain embodiments includes a MEMS estimated next position calculator. Component 1942 receives input from components 1932 and 1940 and provides output to be received at estimator component 1908, feedback component 1964 and feedback component 1972.

Component 1942 calculates in certain embodiments a MEMS open loop position that is used for seek profiles when no capacitance measurement is available or the capacitance measurement is determined to be flawed. For example, an output may be estimated and represented as value $X_{k+1}$, where k+1 represents a next position and k represents a current position of a MEMS actuated and/or MEMS actuation component. A MEMS predicted behavior may be calculated in one example as:

$$\text{Estimated\_}X_{k+1}=X_k+X'_k*\Delta t+\frac{1}{2}X''_k*\Delta t^2;$$

where X, X' and X" represent position, velocity and acceleration vectors, respectively, or alternatively scalars when only the direction of auto-focus movement of the MEMS actuated component of the imaging system of a camera module is taken into account in accordance with certain embodiments or when multiple directions are calculated independently, e.g., when the degrees of freedom are approximated to be orthogonal. Variations on estimated position calculations for a MEMS may involve differences in estimated position terms plus the estimated velocity terms plus the estimated acceleration terms for the desired driver control during open loop positioning of the MEMS.

Component 1944 of an estimator block of a MEMS actuator driver illustrated schematically in FIG. 19 in accordance with certain embodiments includes a unit sampler of a previous state. Component 1944 receives input from feedback component 1964. The component 1944 may be configured to hold a previous estimated position, e.g., Estimated_$X_{k-1}$ to be used for error calculation in an estimator plant.

Component 1946 of an estimator block of a MEMS actuator driver illustrated schematically in FIG. 19 in accordance with certain embodiments includes an error calculator. The component 1946 receives inputs from components 1944 and 1964 in the example embodiment of FIG. 19 and provides output to be received at components 1948, 1950, 1954 and 1936. The component 1946 may be configured to subtract a current estimated location from a previous estimated location and create an error location for an estimator calculator. In other embodiments, one or more quantities involved in the estimation is/are real, e.g., measured and/or has a real value component together with one or more estimated component values.

In general, an estimator block such as component 1802 of FIG. 18, or a component or component block thereof, may use entirely estimated values or a combination of real and estimated values or entirely real, measured, averaged and/or monitored values as inputs to calculations of another estimated value such as a capacitance associated with a MEMS device that depends on one or more parameters such as relative position of a movable lens or lens group within an imaging system of an auto-focus camera module.

Components 1948 and 1950 of an estimator block of a MEMS actuator driver illustrated schematically in FIG. 19 in accordance with certain embodiments are configured for error calculation for acceleration. Components 1948 and 1950 each receive input from component 1946. Component 1950 also receives the output of component 1948 as another input. Component 1950 provides output to be received at component 1956. Components 1948 and 1950 are configured in certain embodiments to subtract a current estimated location from a previous estimated location and to create an error location for an acceleration portion of an estimator block calculator by taking differences between previous error calculations to predict an acceleration component of the calculator.

Component 1952 of an estimator block of a MEMS actuator driver illustrated schematically in FIG. 19 in accordance with certain embodiments is configured as a position observer. Component 1952 receives input from feedback component 1964.

Component 1954 of an estimator block of a MEMS actuator driver illustrated schematically in FIG. 19 in accordance with certain embodiments is configured as a velocity observer. Component 1954 receives input from component 1946.

Component 1956 of an estimator block of a MEMS actuator driver illustrated schematically in FIG. 19 in accordance with certain embodiments is configured as an acceleration observer. Component 1956 receives input from component 1950.

Component 1958 of an estimator block of a MEMS actuator driver illustrated schematically in FIG. 19 in accordance with certain embodiments is configured as an calibration enable component 1958. Component 1958 provides input to be received at component 1972. The calibration enable component 1958 is used in certain embodiments to calibrate one or more estimator coefficients by switching in one or more actual capacitance measurements during motion and/or observing position, velocity and/or acceleration linearity and/or overshoot. The calibration enable coefficient 1958 scales A, B, C coefficients in certain embodiments during actual motion to correct an estimator plant for temperature and/or position variances.

Components 1960 and 1962 of a MEMS actuator driver illustrated schematically in FIG. 19 in accordance with certain embodiments are configured to provide one or more actual corrected capacitance scalars. Component 1960 provides output to be received as input at component 1962. Component 1962 also receives input from component 1922. Components 1960 and 1962 may be configured to be used to calibrate an Estimator block by scaling a capacitance range to a known size, e.g., preset, predetermined, selected, calculated and/or measured size, for correct estimator ratio settings.

Component 1964 of an estimator block of a MEMS actuator driver illustrated schematically in FIG. 19 in accordance with certain embodiments may be configured as an observer and calibration switch between real measurement and estimated values. Component 1964 receives input from components 1962, 1958 and 1942.

Component 1968 of a MEMS actuator driver illustrated schematically in FIG. 19 in accordance with certain embodiments may be configured to request a new position value. Component 1968 may produce a repeating sequence stair to be received as input at component 1969 which also receives input from integrator component 1970. The new position value request component 1968 may be configured to be I2C commanded and/or host requested to receives MEMS position requests and provide MEMS position information. For example, component 1968 may be configured to compare and calculate requested MEMS positions versus MEMS current positions.

Component 1970 of a MEMS actuator driver illustrated schematically in FIG. 19 in accordance with certain embodiments may be configured to request a new scaled position. New scaled position request component 1970 may be configured to scale requests from 0 to 100% to a value between a maximum capacitance and a minimum capacitance, e.g., as measured during power up calibration. Component 1970 may also be configured to create a virtual distance calculation between min capacitance and max capacitance.

Component 1972 of a MEMS actuator driver illustrated schematically in FIG. 19 in accordance with certain embodiments may be configured to determine whether to use an estimated position or a real position for feedback. Component 1972 receives input from component 1976, 1958 and 1942, and provides output to be received at component 1910. Decision switch 1972 may be configured to be used at run time to decide to use an actual capacitance term or an estimated feedback term for closed loop control operation.

Components 1974 and 1976 of a MEMS actuator driver illustrated schematically in FIG. 19 in accordance with certain embodiments may be configured to provide a capacitance feedback scalar. Component 1974 provides output to be received at component 1976 which also receives input from component 1922. Capacitance feedback scalar component 1976 produces output to be received at component 1972. Capacitance feedback scalar component 1974 may be configured to multiply the capacitance feedback to equalize the difference between estimated feedback and real capacitance measurements during switching between terms.

Component 1978 of a MEMS actuator driver illustrated schematically in FIG. 19 in accordance with certain embodiments may be configured as a control loop plant and/or state space component or provider. Component 1978 receives input from component 1910 and provides output to be received at component 1980 and at the high voltage driver 1904. The control loop plant 1978 may be configured to output a MEMS driver voltage for a capacitance or an estimated position calculator derivation. The control loop plant 1978 may be configured to output the term $Y_n$, where n represents a current sample. The control loop plant 1978 may be configured to gather a next estimated position from a state space estimator, e.g., represented as $X_{n-1}$, to compare against an open loop estimator. The control loop plant 1978 may be configured as a closed loop state space output calculator, where: $Y_n = Cx_n + Du_n$, where C and D are scalars for the two terms. For example, C may be a scalar for a current error position $x_n$, and D may be a scalar from an integrator calculator $u_n$. The term $u_n$ may represent a sum of error positions, e.g., $x_n + x_{n-1} + x_{n-2} + \ldots x_{n-z}$. The term $x_{n-z}$ may represent a first sample.

Component 1980 of a MEMS actuator driver illustrated schematically in FIG. 19 in accordance with certain embodiments may be configured as a low voltage driver monitor 1980 and/or a closed loop driver observer 1980 that receives input from a control loop plant 1978 and/or state space provider 1978.

Components 1982 and 1984 of a MEMS actuator driver illustrated schematically in FIG. 19 in accordance with certain embodiments may be configured to provide a mechanical MEMS disturbance. Component 1982 provides output to be received at component 1984. The mechanical MEMS disturbance may be a periodic signal, such as a sine wave or another waveform having sequential increasing and decreasing portions. The sequential increasing and decreasing portions may be smooth or discontinuous, and may include a plateau portion between a pair of increasing and decreasing portions, and may include one or more steps, sawtooths, or multilinear features, or one or more positive or negative cut-off exponential portions, or one or more parabolic or hyperbolic curved portions, or sequences of two or more increasing or decreasing portions followed respectively by decreasing or increasing portions, or combinations of these or other waveforms of this nature.

The components 1982 and 1984 may be configured to be used for calibration to modulate the MEMS and calculate the frequency response of the MEMS. The components 1982 and 1984 may be configured to be used for sine wave capacitance phase calculation to drive the MEMS with a small AC waveform and compare the phase of the driver versus the MEMS capacitance response. The components 1982 and 1984 may be configured to be used for debugging the MEMS physical motion during shock and vibration testing.

Component 1986 of a MEMS actuator driver illustrated schematically in FIG. 19 in accordance with certain embodiments may be configured as a system transport delay. The system transport delay component 1986 may be configured for real system simulation. The system transport component may be configured to create a delay of driver voltage out to a MEMS device.

Component 288 of a MEMS actuator driver illustrated schematically in FIG. 19 in accordance with certain embodiments may be configured to provide a MEMS model. MEMS model component may be configured to provide a second order MEMS physical response model for simulation. In one example embodiment, the MEMS model may include:

$(F)/(As^2+Bs+C)$ in the frequency domain, where F, A, B, and C are set to appropriate values configured to correctly or approximately represent a mechanical response of a MEMS including one or more of motion behavior, ringing and/or settling time.

Component 1990 was referred to above as being configured to generator a noise component, e.g., a band-limited white noise component signal to be received as component 1902 along with the output from component 1988.

Component 1992 of a MEMS actuator driver illustrated schematically in FIG. 19 in accordance with certain embodiments may be configured to provide a MEMS position response and/or a noise stimulus response, e.g., as a simulation. Component 1992 receives input from component 1902 which also provides output to be received at capacitance measurement component 1906.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited above and below herein are incorporated by reference, as well as the background, abstract and brief description of the drawings, and U.S. application Ser. Nos. 13/571,395, 13/571,405, 13/571,397, 13/571,393, 12/213,472, 12/225,591, 12/289,339, 12/774,486, 13/026,936, 13/026,937, 13/036,938, 13/027,175, 13/027,203, 13/027,219, 13/051,233, 13/163,648, 13/264,251, and 61/698,567 and PCT application WO2007/110097, and U.S. Pat. No. 6,873,358, and RE42,898 are each incorporated by reference into the detailed description of the embodiments as disclosing alternative embodiments.

The following are also incorporated by reference as disclosing alternative embodiments:

U.S. Pat. Nos. 8,055,029, 7,855,737, 7,995,804, 7,970,182, 7,916,897, 8,081,254, 7,620,218, 7,995,855, 7,551,800, 7,515,740, 7,460,695, 7,965,875, 7,403,643, 7,916,971, 7,773,118, 8,055,067, 7,844,076, 7,315,631, 7,792,335, 7,680,342, 7,692,696, 7,599,577, 7,606,417, 7,747,596, 7,506,057, 7,685,341, 7,694,048, 7,715,597, 7,565,030, 7,636,486, 7,639,888, 7,536,036, 7,738,015, 7,590,305, 7,352,394, 7,564,994, 7,315,658, 7,630,006, 7,440,593, 7,317,815, and 7,289,278, and U.S. patent application Ser. Nos. 13/306,568, 13/282,458, 13/234,149, 13/234,146, 13/234,139, 13/220,612, 13/084,340, 13/078,971, 13/077,936, 13/077,891, 13/035,907, 13/028,203, 13/020,805, 12/959,320, 12/944,701 and 12/944,662

United States published patent applications serial nos. 2012/0019614, 2012/0019613, 2012/0008002, 2011/0216156, 2011/0205381, 2012/0007942, 2011/0141227, 2011/0002506, 2011/0102553, 2010/0329582, 2011/0007174, 2010/0321537, 2011/0141226, 2010/0141787, 2011/0081052, 2010/0066822, 2010/0026831, 2009/0303343, 2009/0238419, 2010/0272363, 2009/0189998, 2009/0189997, 2009/0190803, 2009/0179999, 2009/0167893, 2009/0179998, 2008/0309769, 2008/0266419, 2008/0220750, 2008/0219517, 2009/0196466, 2009/0123063, 2008/0112599, 2009/0080713, 2009/0080797, 2009/0080796, 2008/0219581, 2009/0115915, 2008/0309770, 2007/0296833, and 2007/0269108.

What is claimed is:

1. A MEMS actuator driver comprising:
 a capacitance measurement component configured to measure an actuator capacitance of a MEMS component, the capacitance measurement component comprising a Nyquist sampling time discriminator configured to detect ringing of the MEMS component during operation;
 a smart logic component configured to determine a set of MEMS driver control values based on an analysis of the actuator capacitance and a ringing calibration operation; and
 a MEMS driver component configured to receive the set of MEMS driver control values and control the position or motion, or both, of the MEMS component based on the MEMS driver control values.

2. The MEMS actuator driver of claim 1, further comprising a driver control loop component configured to receive the set of MEMS driver control values from the smart logic component and output appropriate MEMS control values to the MEMS driver component.

3. The MEMS actuator driver of claim 1, wherein the smart logic component is further configured to determine a motion, a displacement, or both, of an optical component supported by the MEMS component based on the actuator capacitance.

4. The MEMS actuator driver of claim 1, wherein the capacitance measurement component further comprises a programmable driver equalization component configured to provide a voltage drive signal based on a capacitance sensing settling time.

5. The MEMS actuator driver of claim 1, wherein the capacitance measurement component further comprises a programmable current source configured to adjust a capacitance measurement above a noise level.

6. The MEMS actuator driver of claim 1, wherein the capacitance measurement component is further configured to implement a programmable sliding window configured to adapt to an actuation of the MEMS component.

7. The MEMS actuator driver of claim 1, further comprising a capacitance estimator configured to provide a calculated capacitance for when no actual capacitance measurements are obtained due to an error.

8. The MEMS actuator driver of claim 1, further comprising a capacitance scaling/decision logic component configured to adjust the actuator capacitance to stabilize a control feedback loop.

9. A method of operating a MEMS-actuated auto-focus camera module, the method comprising:
   measuring an actuator capacitance of a MEMS component of a MEMS actuator;
   determining a set of MEMS driver control values based on an analysis of the actuator capacitance and a ringing calibration operation;
   controlling position or motion, or both, of the MEMS component based on the MEMS driver control values; and
   providing a voltage drive signal to the MEMS actuator based on a capacitance sensing settling time.

10. The method of claim 9 further comprising determining a motion, a displacement, or both, of an optical component supported by the MEMS component based on the actuator capacitance.

11. The method of claim 9 further comprising detecting a ringing of the MEMS actuator during operation by a Nyquist sampling time discriminator.

12. The method of claim 9 further comprising adjusting a capacitance measurement above a noise level by a programmable current source.

13. The method of claim 9 further comprising implementing a programmable sliding window to adapt to an actuating of the MEMS component.

14. The method of claim 9 further comprising providing a calculated capacitance by a capacitance estimator when no actual capacitance measurements are obtained due to an error.

15. The method of claim 9 further comprising adjusting the actuator capacitance to stabilize a control feedback loop.

16. A compact auto-focus camera module, comprising:
   an image sensor;
   an optical train comprising multiple lenses including at least one movable lens;
   a housing configured to contain the optical train and the image sensor;
   a MEMS actuator configured to move the at least one movable lens along an optical path to focus a subject onto the image sensor; and
   a MEMS actuator driver configured to drive the MEMS actuator, the MEMS actuator driver comprising:
      a capacitance measurement component configured to measure an actuator capacitance, the capacitance measurement component comprising a programmable current source configured to adjust a capacitance measurement beyond noise levels;
      a smart logic component configured to determine a set of MEMS driver control values based on an analysis of the actuator capacitance and a ringing calibration operation; and
      a MEMS driver component configured to receive the set of MEMS driver control values and control position or motion, or both, of a MEMS component based on the MEMS driver control values.

17. The compact auto-focus camera module of claim 16,
wherein the at least one movable lens is supported by the MEMS component, and
wherein the smart logic component is further configured to determine a motion, a displacement, or both, of the at least one movable lens based on the actuator capacitance.

18. The compact auto-focus camera module of claim 16, wherein the capacitance measurement component comprises a Nyquist sampling time discriminator to detect a ringing of the MEMS actuator during operation.

* * * * *